US011524241B2

(12) United States Patent
Salakka et al.

(10) Patent No.: US 11,524,241 B2
(45) Date of Patent: Dec. 13, 2022

(54) METHOD AND SYSTEM FOR DESIGNING GAME PLAY AND ECONOMIES

(71) Applicant: Unity IPR ApS, Copenhagen (DK)

(72) Inventors: Kaisa Hillervo Salakka, Helsinki (FI); Dominik Trnecka, Lohja (FI); Charles Janusz Migos, Millbrae, CA (US); Morgane Mendonça Santos, Los Angeles, CA (US); Tuomas Juhani Harju, Kirkkonummi (FI); Ruoyu Sun, Espoo (FI); Janne Mikael Kopponen, Helsinki (FI); Robert Gabriel Walter, Cologne (DE)

(73) Assignee: Unity IPR ApS, Copenhagen (DK)

( * ) Notice: Subject to any disclaimer, the term of this patent is extended or adjusted under 35 U.S.C. 154(b) by 0 days.

(21) Appl. No.: 17/511,411

(22) Filed: Oct. 26, 2021

(65) Prior Publication Data

US 2022/0126208 A1   Apr. 28, 2022

Related U.S. Application Data

(60) Provisional application No. 63/105,748, filed on Oct. 26, 2020.

(51) Int. Cl.
*A63F 13/67* (2014.01)
*A63F 13/79* (2014.01)
*G06F 16/901* (2019.01)

(52) U.S. Cl.
CPC .............. *A63F 13/67* (2014.09); *A63F 13/79* (2014.09); *G06F 16/9024* (2019.01)

(58) Field of Classification Search
None
See application file for complete search history.

(56) References Cited

U.S. PATENT DOCUMENTS

| 2009/0124310 | A1* | 5/2009 | Svanas | G07F 17/32 463/16 |
|---|---|---|---|---|
| 2017/0136362 | A1* | 5/2017 | Bucher | A63F 13/798 |
| 2018/0147491 | A1* | 5/2018 | Lowery | A63F 13/67 |
| 2021/0089433 | A1* | 3/2021 | Mattar | G06F 11/3688 |

* cited by examiner

*Primary Examiner* — Jason T Yen
(74) *Attorney, Agent, or Firm* — Schwegman Lundberg & Woessner, P.A.

(57) ABSTRACT

A method of improving game development is disclosed. A game model graph of a video game is created or modified using visual scripting nodes. The game model graph represents one or more game systems and/or one or more economies. The nodes are linked to game resources from the video game. Player profiles describing a plurality of different player types are accessed to be used during a simulation of the game model graph. One or more additional simulations are performed. Each of the one or more additional simulations includes executing the game model graph using the player profiles and the game resources. Data is extracted from the one or more additional simulations to determine behavior of the one or more game systems, the one or more game economies, and/or the resources within the video game over time and across the player types.

20 Claims, 18 Drawing Sheets

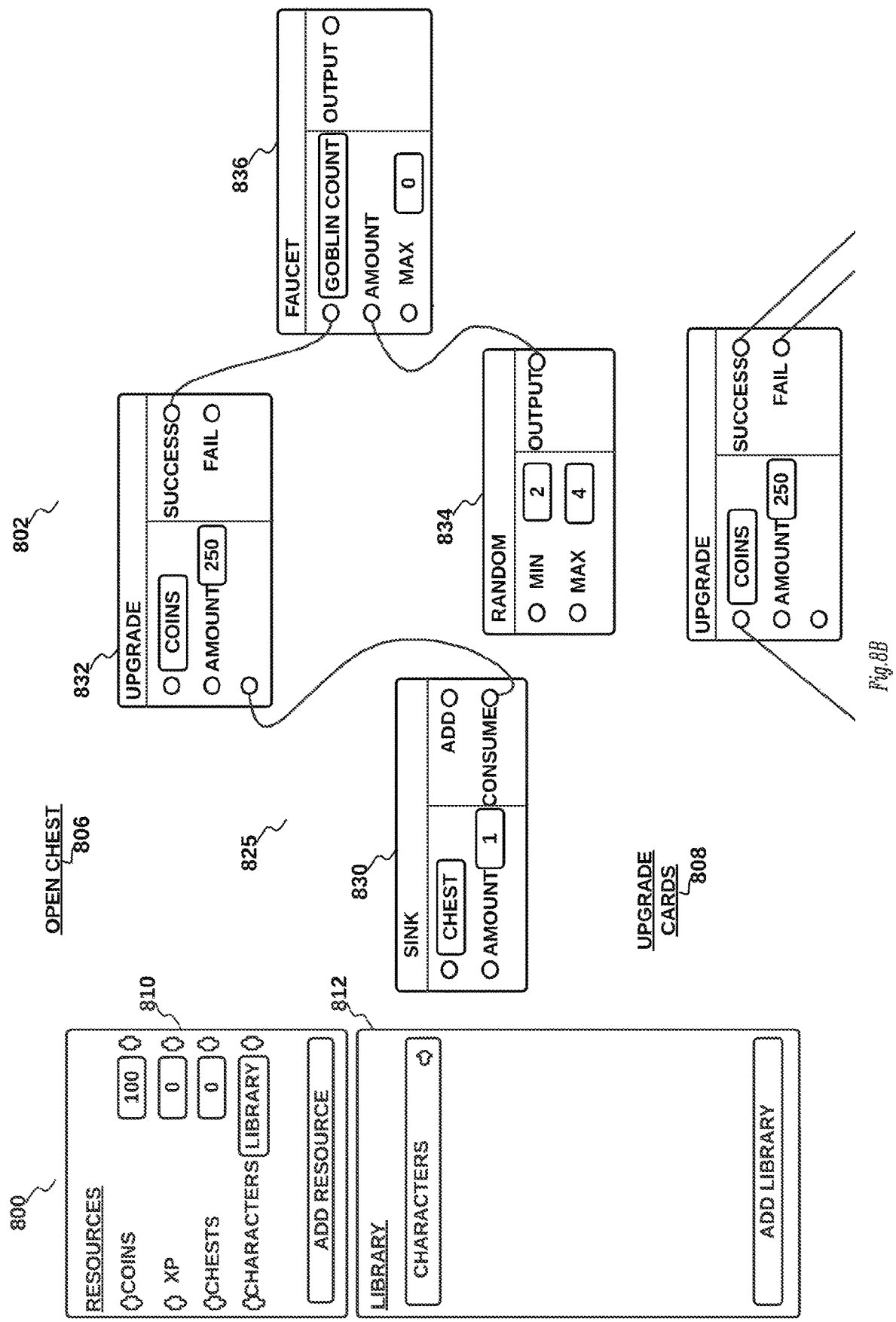

METHOD AND SYSTEM FOR DESIGNING GAME PLAY AND ECONOMIES

CROSS-REFERENCE TO RELATED APPLICATIONS

This application claims the benefit of U.S. Provisional Application No. 63/105,748, filed Oct. 26, 2020, entitled "METHOD AND SYSTEM FOR DESIGNING GAME PLAY AND ECONOMIES," which is incorporated by reference herein in its entirety.

TECHNICAL FIELD

The subject matter disclosed herein generally relates to the technical field of computer systems, and in one specific example, to computer systems and methods for simulating and modifying video game play and economies.

BACKGROUND OF THE INVENTION

Designing video game systems and the economies therein is a difficult problem. One method of game system design and economy design is to start by generating flowcharts that describe core loops of a game. Detailed game economies associated with the core loops can then be defined using spreadsheets, which inherently become large, complex sources of data that are maintained manually over a long period of time (e.g., throughout game design and beyond). Finally, values from the spreadsheets get incorporated into game code either manually or with a remote settings solution. This process is mostly manual and does not scale well for large games with complex game design and economies.

BRIEF DESCRIPTION OF THE DRAWINGS

Features and advantages of example embodiments of the present disclosure will become apparent from the following detailed description, taken in combination with the appended drawings, in which:

FIG. 8B is a schematic illustrating a graphical user interface display for the Game Design Tool user interface (UI) for a game design tool system, in accordance with one embodiment;

DETAILED DESCRIPTION

Figure 1:
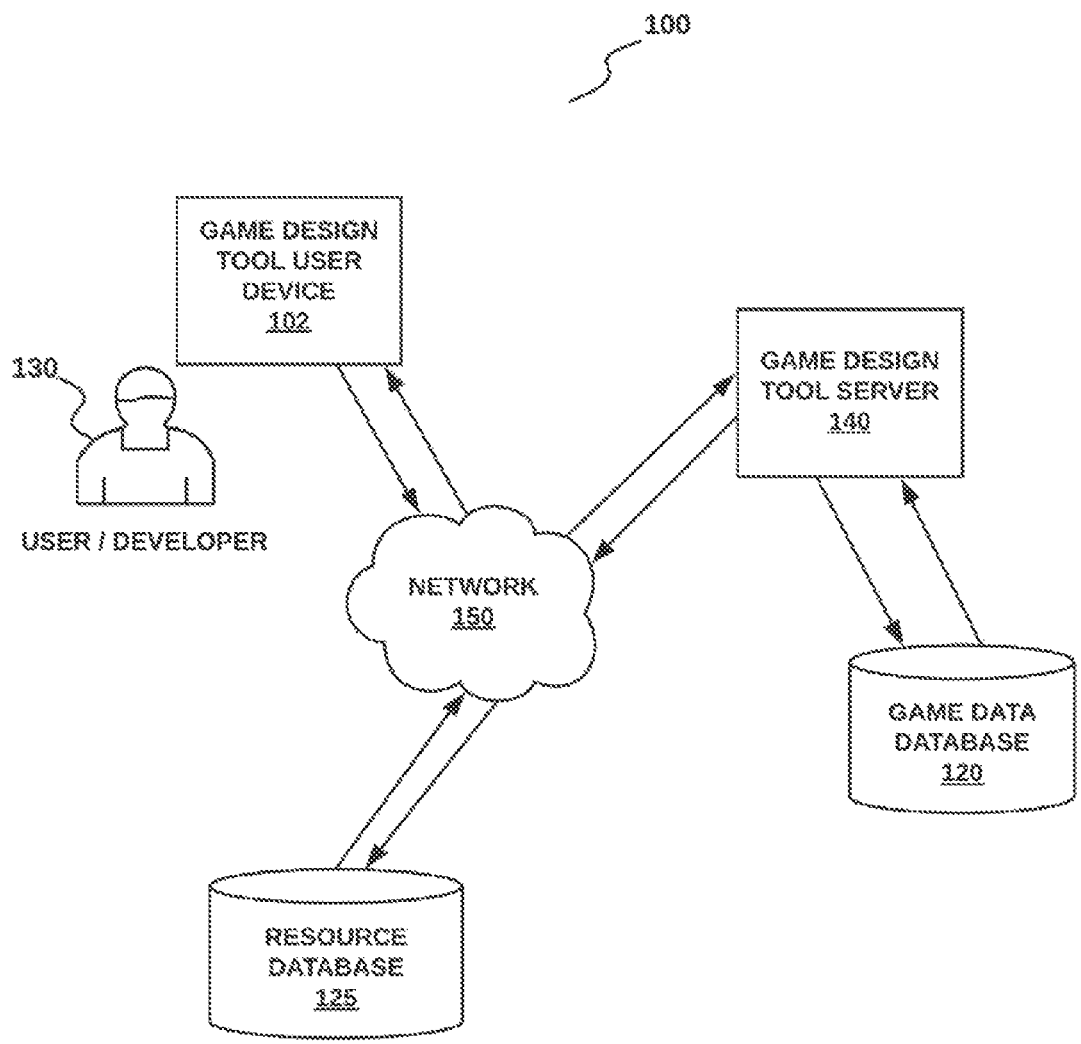
FIG. 1 is a schematic illustrating a game design tool system, in accordance with one embodiment.

The description that follows describes example systems, methods, techniques, instruction sequences, and computing machine program products that, comprise illustrative embodiments of the disclosure, individually or in combination. In the following description, for the purposes of explanation, numerous specific details are set forth in order to provide an understanding of various embodiments of the inventive subject. matter. It will be evident, however, to those skilled in the art, that various embodiments of the inventive subject matter may be practiced without these specific details.

The term 'content' used throughout the description herein should be understood to include all forms of media content items, including images, videos, audio, text, 3D models (e.g., including textures, materials, meshes, and more), animations, vector graphics, and the like.

The term 'came' used throughout the description. herein should be understood to include video games and applications that execute and present video games on a device, and applications that execute and present simulations on device. The term 'game' should also be understood to include programming code (either source code or executable binary code) which is used to create and execute the game on a device.

The term 'environment' used throughout the description herein should be understood to include 2D digital environments (e.g., 2D video game environments, 2D simulation environments, 2D content creation environments, and the like), 3D digital environments (e.g., 3D game environments, 3D simulation environments, 3D content creation environments, virtual reality environments, and the like), and augmented reality environments that include both a digital (e.g., virtual) component and a real-world component.

The term 'game object', used throughout the description herein is understood to include any object of digital nature, digital structure or digital element within an environment (e.g., a digital object). A game object can represent (e.g., in a corresponding data structure) almost anything within the environment; including 3D digital models (e.g., characters, weapons, scene elements (e.g., buildings, trees, cars, treasures, and the like)) with 3D model textures, backgrounds (e.g., terrain, sky, and the like), lights, cameras, effects (e.g., sound and visual), animation, and more. The term 'came object' may also be understood to include linked groups of individual game objects. A game object is associated with data that describes properties and behavior for the object.

The terms 'asset', 'game asset', and 'digital asset', used throughout the description herein are understood to include any data that can be used to describe a game object or can be used to describe an aspect of a digital project (e.g., including: a game, a film, a software application). For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more game objects within a game at runtime (e.g., during execution of the game).

The terms 'client' and 'application client' used throughout the description herein are understood to include a software client or software application that can access data and services on a server, including accessing over a network.

Throughout the description herein, the term "agent" and "AI agent" should be understood to include entities such as a non-player character (NPC), a robot, and a game world which are controlled by an artificial intelligence system or model.

Throughout the description herein, the term 'game economy' should be understood to include a virtual economy within a game wherein game objects may be priced (e.g., with a virtual currency, game points, or the like). In addition, the term 'game economy' may include a configuration (e.g., a collection of connected nodes within a game model graph) of sources, sinks and associated control mechanisms for an availability of game objects (e.g., weapons, armor, extra speed, extra lives, and the like) within a game. For example, a game economy may refer to a game model graph configuration (or a part thereof) that determines a total amount of an availability of game object within a game (e.g., a number and type of a weapon available throughout a game), a rate of an availability of a game object within a game (e.g., a rate at which a number and type of a weapon becomes available throughout a game), and the like.

The present invention includes apparatuses which perform one or more operations or one or more combinations of operations described herein, including data processing systems which perform these methods and computer readable media which when executed on data processing systems cause the systems to perform these methods, the operations or combinations of operations including non-routine and unconventional operations or combinations of operations.

The systems and methods described herein include one or more components or operations that are non-routine or unconventional individually or when combined with one or more additional components or operations, because, for example, they provide a number of valuable benefits to software developers and video game creators. For example, the systems and methods described herein simplify game development by simulating game play in order to test a game economy design and a game play design. In accordance with an embodiment, the systems and methods may provide a tool with simple visual scripting nodes for creating a model (e.g., as described with respect to operation 304 of the method 300 shown in FIG. 3) of a game system and a game economy and connecting the model with game code (e.g., as described with respect to operation 306 of the method 300 described with respect to FIG. 3) from the game to be simulated. The model may ice simple to visualize and understand due to the visual scripting nodes, and the model may be used within the systems and methods to simulate game play and generate information which may be used (e.g., by a game developer) to determine potential resource bottlenecks early in a game development process as well as to model a future success of the game design. Additionally, the systems and methods described herein provide continuous design and adjustment of a game economy and game play after release of a game (e.g., release to the public) by providing a connection to and simulation of live game data (e.g., via live game services) as described with respect to operation 314 of the method 300 described with respect to FIG. 3.

Figure 3:
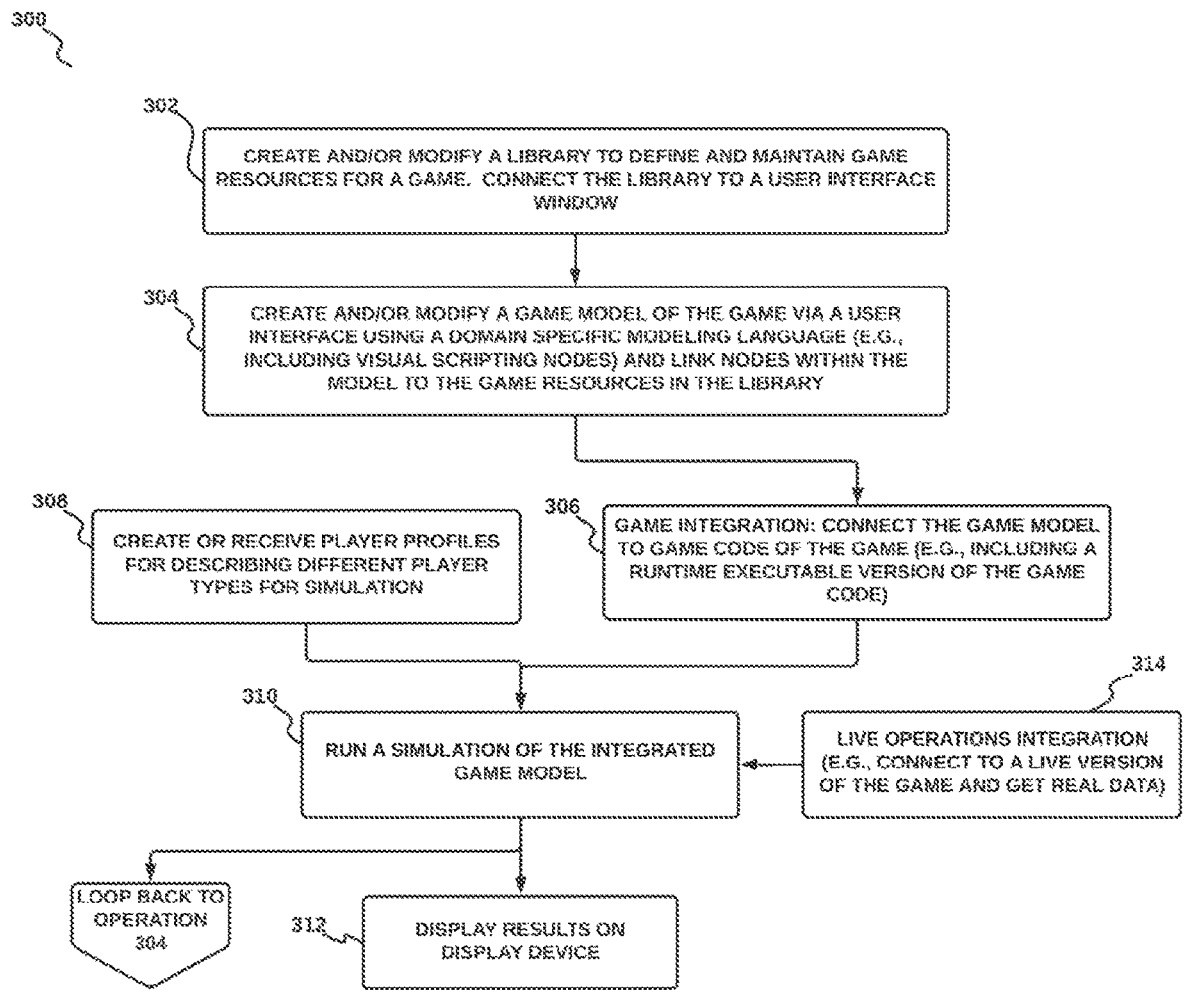
FIG. 3 is a schematic illustrating a method for creating and simulating a game model graph for a game within a game design tool system, in accordance with one embodiment.

The systems and methods described herein, and as described with respect to the method 300 shown in FIG. 3 provide support for game designers to design and simulate behavior of game systems and economies within a game over time. The methods and systems can be used throughout a game design process, from a beginning of game development to a live operating phase after release to the public. A purpose of the simulations (e.g., as described in operation 310 of the method 300) is to enable testing of a design of a game early in a design process. The simulations may reveal potential imbalances in a game system. and an economy design and can also predict a future success of the design (e.g., with respect to game players). The simulations help when used in an iterative process of game design and development of a game as it can provide insights before a first release of the game.

A method of improving game development is disclosed. A game model graph of a video game is created or modified using visual scripting nodes. The game model graph represents game systems and/or an economy. The nodes are linked to one or more game resources from the video game. Player profiles describing a plurality of different player types are accessed to be used during a simulation of the game model graph. One or more additional simulations are performed. Each of the one or more additional simulations includes executing the game model graph using the player profiles and the one or more game resources. Data is extracted from the one or more additional simulations to determine behavior of the game systems, the economy, and the resources within the video game over time and across the player types.

A game model graph (e.g., as described with respect to operation 304 of the method 300 shown in FIG. 3) built within a Game Design Tool system 100 (e.g., as described with respect to FIG. 1, FIG. 2A, FIG. 2B, FIG. 3, FIG. 4, FIG. 5, FIG. 6A-6Q, FIG. 7, FIG. 8A, FIG. 8B, FIG. 9A, and FIG. 9B) can be integrated directly with game code (e.g., as described with respect to operation 306 of the method 300), providing a single source for system and economy design of a game. The direct integration described in operation 306 may include a direct connection to game code, whereby changes made in visual scripting nodes (e.g., as described with respect to operation 304 of the method 300 shown in FIG. 3) may be directly and automatically implemented in the game code. The direct integration within operation 306 avoids a manual copy and paste operation of game design values and economy values to the game code (e.g., manual copy/paste operations can lead to mismatches between a game design and an actual player experience and is inherently error-prone).

Turning now to the drawings, systems and methods, including non-routine or unconventional components or operations, or combinations of such components or operations, for a game design tool system in accordance with embodiments of the invention are illustrated. In accordance with many embodiments, and shown in FIG. 1 is a game design tool system 100. The game design tool system 100 includes a game design tool user device 102, a game design tool server device 140 in networked communication over a network 150. In accordance with an embodiment, the game design tool system 100 includes a resource database 125 which may contain data describing game assets and data describing other resources (e.g., within a library) that may be required by a video game executing on the game design tool user device 102. In accordance with an embodiment, the game design tool system 100 may include a Game Data database 120 that stores data from additional game design tool systems that include additional game design tool user devices (the additional game design tool systems and additional game design tool user devices are not shown in FIG. 1 but may be incorporated within operation 314 of the method 300 described below).

In accordance with an embodiment, FIG. 1 shows a single user/player 130 and a single game design tool user device 102; however, it should be understood that during operation a plurality of users 130 on a plurality of game design tool user devices 102 may be in operation and in communication with the game design tool server 140, and store data on the Game Data database 120 over the network 150.

Figure 2A:
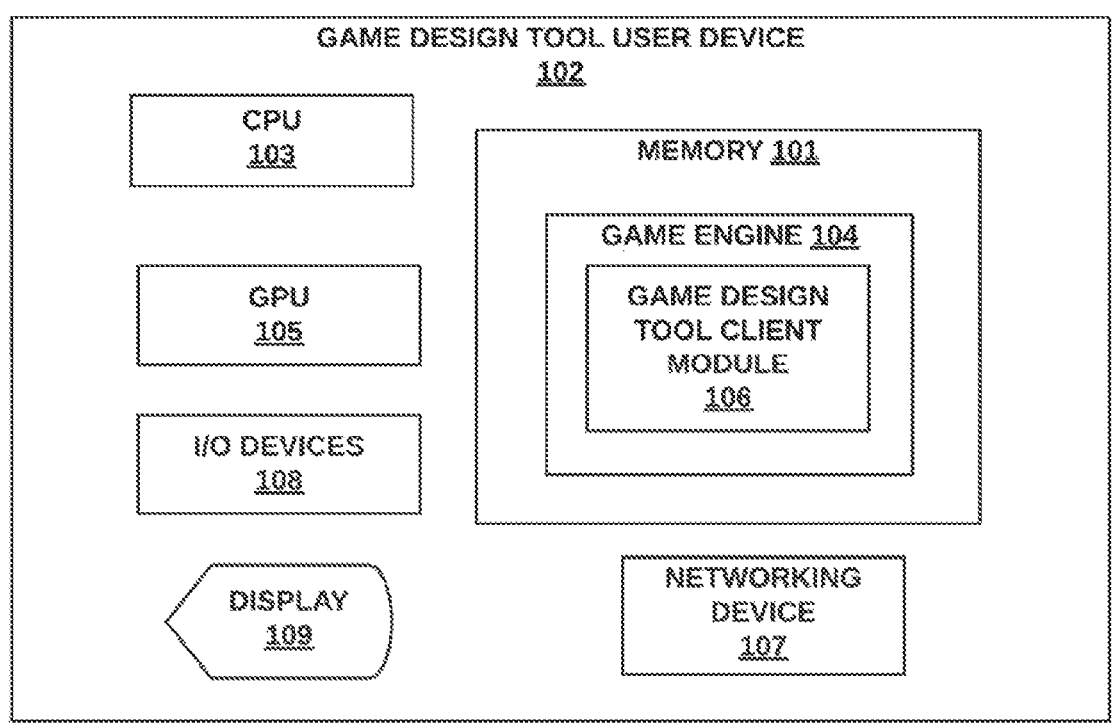
FIG. 2A is a schematic illustrating a game design tool user device, in accordance with one embodiment.

In accordance with an embodiment and shown in FIG. 2A is a schematic showing details of a game design tool user device 102 within a game design tool system 100. The game design tool user device 102 includes one or more central processing units 103 (CPUs), and graphics processing units 105 (GPUs). The CPU 103 (and the GPU 105) is any type of processor, processor assembly comprising multiple processing elements (not shown), having access to a memory 101 retrieve instructions stored thereon, and execute such instructions. Upon execution of such instructions, the instructions implement the processing device 103 to perform a series of tasks as described below in reference to FIG. 3 and FIG. 4. The memory 101 can be any type of memory device, such as random-access memory, read only or rewritable memory, internal processor caches, and the like.

The game design tool user device 102 also includes one or more input/output devices 108 such as, for example, a keyboard or keypad, mouse, pointing device, touchscreen, microphone, camera, and the like, for inputting information in the form of a data signal readable by the processing device 103. The game design tool user device 102 further includes one or more display devices 109, such as a computer monitor, a touchscreen, and a head mounted display (HMD)), which may be configured to display digital content including video, a video game environment, an integrated development environment and a virtual simulation environment to the user 130. The display device 109 is driven or controlled by the one or more GPUs 105 and optionally the CPU 103. The GPU 105 processes aspects of graphical output that assists in speeding up rendering of output through the display device 109. The game design tool user device 102 also includes one or more networking devices 107 (e.g., wired or wireless network adapters) for communicating across a network.

The memory 101 on the game design tool user device 102 also stores a game engine 104 (e.g., executed by the CPU 103 or GPU 105) that communicates with the display device 109 and also with other hardware such as the input/output device(s) 108 to present a 3D game environment and a game development environment (e.g., a video game) to the user 130 and to simulate a 3D game environment and game state. The game engine 104 would typically include one or more modules that provide the following: simulation of a virtual environment and game objects therein (e.g., including animation of game objects, animation physics for game objects, collision detection for game objects, and the like), rendering of the virtual environment and the game objects therein, networking, sound, and the like in order to provide the user with a complete or partial virtual environment (e.g., including video game environment or simulation environment) via the display device 120. In accordance with an embodiment, the simulation and rendering of the virtual environment may be de-coupled, each being performed independently and concurrently, such that the rendering always uses a recent state of the virtual environment and current settings of the virtual environment to generate a visual representation at an interactive frame rate and, independently thereof, the simulation step updates the state of at least some of the digital objects (e.g., at another rate). In accordance with an embodiment, the game engine 104 may be implemented within an application such as a video game.

In accordance with an embodiment, the memory 101 on the game design tool user device 102 also stores a game design tool client module 106 for implementing methods for game design and simulation as described herein and in particular with respect to the method shown in FIG. 3. The game design tool client module 106 may be implemented for example as a software development kit (SDK).

Figure 2B:
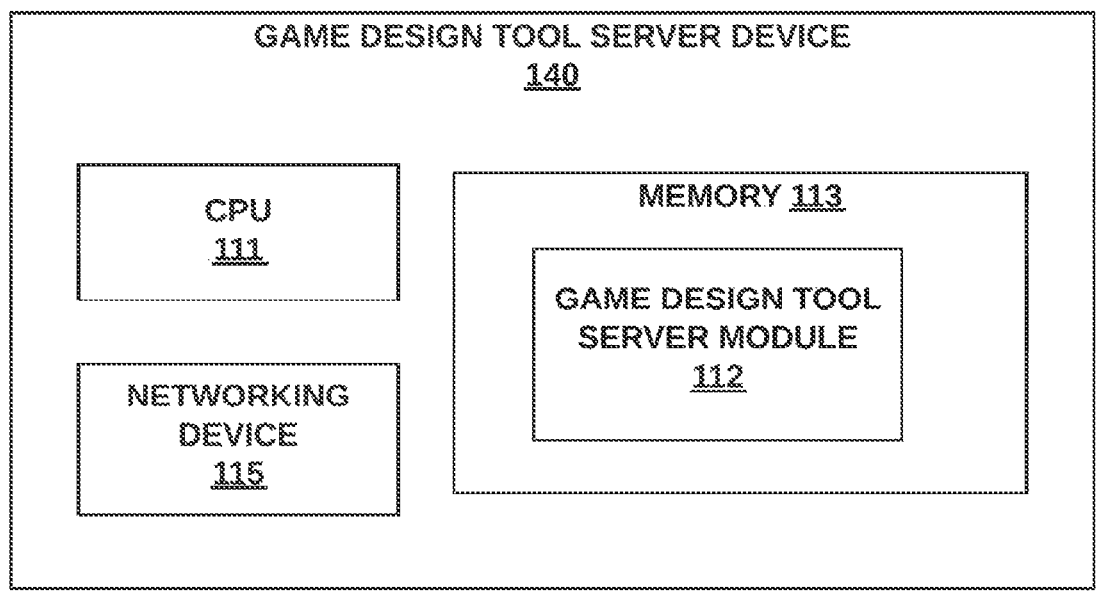
FIG. 2B is a schematic illustrating a game design tool server device, in accordance with one embodiment.

In accordance with an embodiment and shown in FIG. 2B is a game design tool server device 140. The game design tool server device 140 includes one or more central processing units 111 (CPUs). The CPU 111 is any type of processor, processor assembly comprising multiple processing elements (not shown), having access to a memory 113 to retrieve instructions stored thereon, and execute such instructions. Upon execution of such instructions, the instructions implement the processing device 111 to perform a series of tasks as described below in reference to FIG. 3 and FIG. 4. The memory 113 can be any type of memory device, such as random-access memory, read only or rewritable memory, internal processor caches, and the like. The game design tool server device 140 also includes one or more networking devices 115 (e.g., wired or wireless network adapters) for communicating across the network 150.

Figure 4:
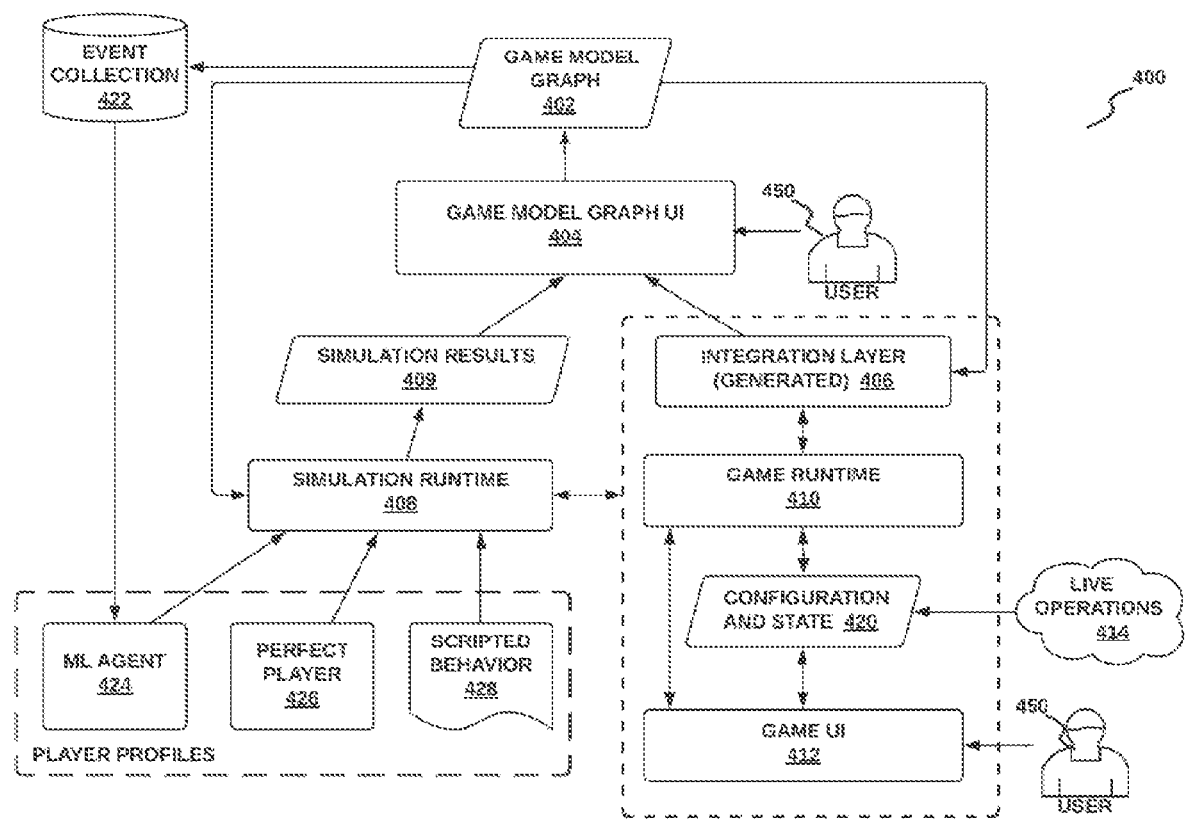
FIG. 4 is a schematic illustrating a flow of data for a game design tool system, in accordance with one embodiment.

In accordance with an embodiment, the memory 113 on the game design tool server device 140 also stores a game design tool server module 112 for implementing methods as described herein and in particular with respect to the methods shown in FIG. 3 and the data flow diagram of FIG. 4. The game design tool server module 112 may be implemented for example as a software development kit (SDK).

In accordance with an embodiment, and shown in FIG. 3 is a flowchart of a method 300 for creating and simulating a game model graph for a game within a game design tool system 100. The method 300 may be used in conjunction with the Game Design Tool system 100 as described with respect to FIG. 1, FIG. 2A, FIG. 2B, FIG. 4, FIG. 5, FIG. 6A-6Q, FIG. 7, FIG. 8A, FIG. 8B, FIG. 9A, and FIG. 9B. In various embodiments, some of the method elements shown in FIG. 3 may be performed concurrently, in a different order than shown, or may be omitted. In accordance with an embodiment, the game model graph is a visual scripting (or visual programming) graph than includes user interface nodes (e.g., as described in FIG. 5 and FIG. 6A, through FIG. 6Q) and which represents game logic for a game (e.g., a video game) or a part of a game. The game logic may represent logic underlying a game economy within a game, and logic underlying mini games (e.g., challenges, treasure hunts, and more) within a game, and more. For example, the game logic may control aspects of the game economy by controlling a frequency, an amount, an input and an output of a plurality of mini games within the game economy (e.g., the game logic may control how often a new armor may be made available to a character within a game, how often a character may find a hidden treasure within a game, how many rewards a character receives after successfully completing a challenge, what type or rewards a character receives after successfully completing a challenge, and the like). In accordance with an embodiment, the method 300 may be performed with a Game Design Tool User Interface (UI), wherein the Game Design Tool User Interface UI is described with respect to FIG. 8A, FIG. 8B, FIG. 9A, and FIG. 9B.

In accordance with an embodiment, in operation 302 of the method 300, a library is created (e.g., within the Game Design Tool UI), wherein the library includes descriptions of game resources for a game. In accordance with an embodiment, the library may be created manually by a developer (e.g., entering the descriptions), or may be created by uploading descriptions (e.g., importing resource descriptions). In accordance with an embodiment, the library enables the user to describe and maintain game resources that may be used within a game runtime execution of the game. In accordance with an embodiment, a game resource is an element that can be quantified (e.g., counted) and can be used as a means to control (e.g., manage) a flow (e.g., an economic flow) of a game. Accordingly, a game resource can include many different elements, including in-game elements such as weapons, cards, and coins, but also less tangible elements including progression meters (e.g., experience points), a list of completed quests, and the like. In accordance with an embodiment, data within the library may be stored locally (e.g., within the game design tool user device 102) or over the network 150 (e.g., within the resource database 125).

In accordance with an embodiment, as part of operation 302, the library may be connected to a graphical user interface window in order to display and manage (e.g., track and modify) values associated with game resources. In accordance with an embodiment, there may be two UI windows, with a first window (e.g., referred to herein as a 'Library Window') to declare and maintain game resource structures (e.g., interconnections between resources), and another window (e.g., referred to herein as a 'Game State window') to observe (e.g., via displayed graphs) and reason about game resource data over time.

In accordance with an embodiment, the library may be designed for managing large numbers of resources (e.g., hundreds or thousands of different game resources) with associated connections between resources (e.g., dependencies between resources and possible hierarchies of resources) that define details of a game system. An example resource (and associated connections) would be a chest resource in a game (e.g., a chest filled with bounty), wherein the chest in the game includes other resources such as cards (e.g., that are defined in the library). The cards in the chest may depend on many other resource items (and properties associated with the items) in a library (e.g., a player level, a rarity of the chest, additional cards a player owns, and the like). For example, when a designer is defining chest contents, the designer will reference other items in the library (cards) and calculate what cards are given based on properties or other items in the library (e.g., a level of the cards needs to be greater than a level of a player opening them). A weapon resource provides another example of interconnection between resources in the library, wherein damage caused by the weapon resource may be determined based on other resources (and associated properties) in the library. For example, the damage caused by the weapon at a time during a game may be determined (or modified) based on one or more of the following: a level of a player resource wielding the weapon at the time, a strength value of the player resource at the time, other gear resources the player resource owns at the time, and more.

In accordance with an embodiment, during operation 304 of the method 300, a plurality of visual scripting nodes is provided via the Game Design Tool UI. The visual scripting nodes (or just 'nodes') include a domain-specific modeling language which can be used (e.g., by a game developer) to express game systems and economies. The domain-specific modeling language is included in the nodes and expressed by a connection of nodes into a graph structure described below with respect to FIG. 5, FIG. 6A-6Q, FIG. 7, FIG. 8A, FIG. 8B, FIG. 9A, and FIG. 9B. For example, the domain specific modeling language provides a means by which a game designer (e.g., or a game developer) can express a game system and an economy design in a way that is intuitive to understand and communicate to others (e.g., via an interconnection of the visual scripting nodes into a graph structure). In accordance with an embodiment, the nodes provide a structural core of the Game Design Tool system 100. In accordance with an embodiment, as part of operation 304, the game resources are connected to a game system by means of the displayed nodes (e.g., by a game developer interacting with the nodes via the user interface). An example of a game model graph created via a user interface is described below with respect to FIG. 7, FIG. 8A, FIG. 8B, FIG. 9A, and FIG. 9B.

In accordance with an embodiment, during operation 306 of the method 300, the game design tool client module 106 may perform a game integration to connect a game model graph (e.g., a game model graph created during operation 304) to game code for the game. The game code includes any software code or programming code that can be compiled into an executable file of the game, and when compiled and executed on a computation device (e.g., such as the game design tool user device 102) causes the computation device to display the game on a display device and communicate with input/output devices in order to interact with a player of the game. The game code may be packaged (e.g., compiled and built) within executable application referred to herein as the game runtime executable. This includes creating at least one executable file and any associated libraries, DLL, or other necessary files for the application to function. The Game integration includes connecting the game model graph with the game code thus making the game model graph an efficient means to experiment and optimize aspects of the game (e.g., aspects including a game economy and game design). During operation, based on the game model graph being integrated into an executable version of the game (e.g., via compiled game code), developers and designers can work closely together and experiment with different game design scenarios (e.g., via a structure of the game model graph and properties of the nodes therein) and receive immediate feedback via a playing of the executable version or the game (e.g., which can be changed in real-time by the graph).

In accordance with an embodiment, as part of operation 306, the game integration may include creating connections between a runtime execution of a game and a game model graph (the connections are described in more detail with respect to FIG. 4). The runtime execution of the game (e.g., or 'game runtime') refers to an executing version of the game runtime executable application/file which is being executed on a computation device. The connections may be configured within an integration layer between the game runtime and the game model graph. In accordance with an embodiment, the integration layer may be configured such that during operation the game model graph updates a game state of a player (items, currencies etc.) based on data received from the game runtime (e.g., a video game). The game runtime may handle user interaction (e.g., showing values on a display screen and reacting to signals from the UI) and signal the game model graph to update a game state (e.g., by updating values stored in a memory). The updating of the game state includes updating aspects of the game related to the player, including an updating of items owned by the player (e.g., weapons, points, currency, etc.), health of a player (number of lives, power level, etc.) position and progress of the player, and the like.

In accordance with an embodiment, the integration layer may also be configured such that during operation the game model graph updates aspects of the game runtime which can modify game logic, game resources, and a displayed game UI. For example, an amount, type, timing, and probability of resource distribution may be changed via nodes within the game model graph. In accordance with an embodiment, the updating of the game runtime may occur dynamically (e.g., during execution of the game runtime) with a loading of different models that include the game logic.

As an example, consider the following sequence of events: A player (e.g., a human or an AI agent) pushes a "Buy Tomato" button in a game UI (e.g., during a playing of the game). The game UI signals the game runtime which signals the game model graph (e.g., via the integration layer) with data describing a request for the player to buy a tomato. Based on the player having requirements to purchase the tomato, a game state for the player is updated (e.g., via the game model graph) to reflect the purchase (e.g., reducing an amount of player money by the tomato price, and increasing an inventory for the player by one tomato). The game UI may then be updated with the updated game state of the player. Additionally, the game model graph may load new game logic (e.g., to modify the price of Tomatoes) based on logic within nodes of the game model graph (e.g., nodes which react to the purchase of the tomato).

With game integration as described in operation 306, a game developer is not required to manually change (e.g., to copy and paste) design and economy values in the game code, which is inherently error-prone and can often lead to mismatches between a game design and an actual player experience.

In accordance with an embodiment, during operation 310 of the method 300, the game design tool client module 106 performs one or more simulations, wherein each of the one or more simulations include a playing of the game runtime by a simulation engine (e.g., a simulation service, an AI agent, and the like) to determine behavior of game systems over time and across a multitude of player types (e.g., player profiles).

In accordance with an embodiment, the game model graph (e.g., described in operation 304) is connected with the simulation engine via the integration layer created in operation 306. In accordance with an embodiment, as part of operation 310, the simulation engine may interact with the game runtime, the game state, and the game UI during the running of the simulation. In accordance with an embodiment, a game designer may define values and parameters used for the simulation during operation 304 (e.g., using the nodes). In addition, the simulation engine may apply player profiles (defined below) during the simulation.

Having the game model graph connected to the simulation engine allows simulations to be run throughout a development process (e.g., early throughout a game design process wherein the game may change substantially, during later stages of development where chances are less significant, and even after release of the game publicly). In accordance with an embodiment, the simulations of operation 310 are run locally (e.g., on the game design tool user device 102). In accordance with another embodiment, the simulations of operation 310 may be run on the server device 140 (e.g., in a cloud service and run at a large scale).

In accordance with an embodiment, after a simulation is complete, or when a simulation is actively stopped, a user may loop back to operation 304 to modify a game model graph and run new simulations.

In accordance with an embodiment, in operation 312 of the method 300, results of simulation from operation 310 may be shown on a display device (e.g., within a user interface).

In accordance with an embodiment, as part of operation 308 of the method 300, the game design tool client module 106 creates or receives player profiles, wherein the player profile describes a plurality of different player types to be used during a simulation of a game (e.g., as described in operation 310). The player types may modify the simulation of the video game via the game model graph. In accordance with an embodiment, the Player profiles may be used for describing different player types to provide realism for simulations (e.g., in order to more accurately simulate a real game playing audience). The player types may include a description of a frequency of how often the player type interacts with one or more features in a game model (e.g., causing a triggering of a Player Action node during a simulation). For example, player types may include 'casual' which may have generally lower frequency interactions with the one or more features, 'hardcore' which may have generally higher frequency interactions with the one or more features, 'heavy spender' which may have higher frequency interactions with purchasing features, and any other type or combination. In accordance with an embodiment, a human game designer (e.g., game developer) can define a plurality of different types of player profiles (e.g., via a user interface), run a plurality of simulations for each type, and analyze results from the plurality of simulations (e.g., perform comparisons of results from different types of player profiles). In accordance with an embodiment, a Player profile includes a description of choices available to a simulated player within game. In accordance with an embodiment, the choices may include one or more actions the simulated player can perform in the game. For example, choices may include limitations on locations and means for a player to use resources, limitations on locations and means for a player to watch advertisements, limitation on when a player may purchase an item, limitations on how often player may play a game, and limitations on how long a player may play a game, and more.

In accordance with an embodiment, a player profile may include a skill parameter (e.g., a numeric value). In accordance with an embodiment, a player profile may include data that describes a frequency and amount of playing sessions (e.g., simulations) for the player profile; wherein the data may include values that describe a number of simulations per time period (e.g., simulations per day), and simulation length and a cooldown period between simulations. The value for simulations per time period may describe how many times a player profile opens a game over the time period, while the simulation length may describe length of time of a simulation, and the cooldown may describe a minimum amount of time between simulations. In accordance with an embodiment, a player profile may include data that describes actions associated with a player action node (described below), wherein the actions may describe a frequency of triggering of the player action node. In accordance with an embodiment, the triggering of the player action node may be associated with a category of node. For example, an action value in a player profile may be linked to a triggering of one or more of the following: a core game node (described below), a core game progression node (described below), an in-app purchase node (described below), or a combination thereof. As an example, a player profile described as 'hardcore' may include values such as 50 simulations per day, simulation length of 5 minutes, minimum cooldown of 5 minutes, with each simulation including 5 core game node actions (e.g., 5 different triggerings of a core game node via the player action node per simulation), and 2 in-app purchase node actions (e.g., 2 different triggerings of an in-app purchase node via the player action node per simulation).

In accordance with an embodiment, as part of operation 308, in addition to using predefined player profiles and creating player profiles (e.g., via a user interface), the game design tool client module 106 may use real player behavior data obtained from human players playing a game (e.g., from a game playing service or server that includes a plurality of player data from human players). Using profiles created from human player data may make the simulations in operation 310 more realistic.

In accordance with an embodiment, the simulations in operation 310 may include a Time machine component that allows for manipulation of a flow of time during a simulation (e.g., by controlling a simulation speed). For example, a user may control time intervals for simulation (e.g., 1 hour, 1 day, 1 week, 1 month, 1 year), or time of day for simulations, or the like. In accordance with an embodiment, the Time Machine component may help optimize a simulation by jumping large sections of time during which a game state may not change substantially (e.g., due to lack of user interacting with the system).

In accordance with an embodiment, at operation 314 of the method 300, data from one or more live games (e.g., or benchmark data) may be gathered and input to the simulations. The use of real data from one or more live games enables a designer of a game (e.g., a game developer) to quantify an accuracy of design assumptions made for the game based on the live game data. In accordance with an embodiment, output from the simulations can be analyzed to determine the following: which systems in the game (e.g., nodes within the game model graph) are resource bottlenecks, which systems in the game are large sinks for award items (e.g., gems), and which levels are too hard/easy to complete.

In accordance with an embodiment, a game model graph (e.g., as created in operation 304) may be connected to a plurality of live game services. For example, a plurality of different game code configurations can be generated (e.g., during operation 306) from a plurality of game model graph configurations and delivered through live operating game distribution or updating service (e.g., via Remote Config™ from Unity Technologies Inc.). The game model graph can also define and send analytic events with full information about the context of different game elements and events.

In accordance with an embodiment, the Game Design Tool UI may support an integration of different live operating tools and services that include the following: analytics on players and player behavior (e.g., via Unity Analytics™ from Unity Technologies Inc.), a monetization of a game through adding advertisements (e.g., via UnityAds™ from Unity Technologies Inc.), an optimization of in-app purchases (e.g., via Unity IAP™ from Unity Technologies Inc.) and a personalization of game experiences (e.g., via GametTune™ from Unity Technologies Inc.). The domain-specific modeling language can contain elements needed for these integrations as pre-integrations that later (e.g., when entering the LiveOps phase) can be taken into use. The integration of elements required for live operations (e.g., within operations 304 and 306 of the method 300) enables a game designer to consider game optimization early on during a game design process and thus may improve player experiences (e.g., when the game gets launched) since components that include ad placements and personalized content are in optimized locations/times in the game flow. In accordance with an embodiment, the Live operations can be used to test different game model graphs created during operation 304. In this case the user (e.g., the game designer) may create different models and choose which versions of the game model graph to send out. In accordance with an embodiment, each of the different game model graphs has more than just different configuration values; for example one set of players may receive a first game model graph wherein the players collect coins in the game and see an ad at the end of the game, while another set of players may receive a second game model graph wherein the player gains score based on how far they progress in the game and then sees an IAP offer at the end of the game. More details on the integration of live operating tools and services are shown with respect to FIG. 8A and FIG. 8B.

In various embodiments, some of the method elements shown in FIG. 3 may be performed concurrently, in a different order than shown, or may be omitted.

In accordance with an embodiment, and shown in FIG. 4 is a data flow diagram 400 of a Game Design tool system 100. In accordance with an embodiment, the data flow diagram 400 includes a game model graph user interface (UI) 404 (e.g., as used in operation 304) which may generate and modify a game model graph 402. The data flow diagram 400 also includes a simulation runtime process 408 which receives and executes (e.g., simulates) the game model graph 402 (e.g., as described with respect to operation 310 of the method.). The simulation runtime process 408 may use player profiles as input (e.g., as described in operation 308), wherein the player profiles used in the simulation may come from one or more of a machine learning (ML) agent 424, a predefined scripted player behavior 428, and a perfect player 426. In accordance with an embodiment, simulation results 409 from the simulation runtime 408 are sent to the game model graph UI for display to the user as described in operation 312). In accordance with an embodiment, a came runtime 410 (e.g., an executing version of a game) manages a display of a game user interface UI 412 (e.g., as part of operation 312) using at least configuration and state data 420 from a game, wherein the configuration and state data 420 is updated by the game runtime 410. The configuration and state data may also be modified by live operations 414 (e.g., as described with respect to operation 314). In accordance with an embodiment, the game runtime 410 may also have an integration layer 406 that allows aspects of the game model graph 402 to be integrated into a game runtime 410. In accordance with an embodiment, the integration layer 406 may send data to the game model graph UI 404. For example, the integration layer 406 may send data directly to a node within a game model graph 402 which is displayed in the game model graph UI 404.

Figure 5:
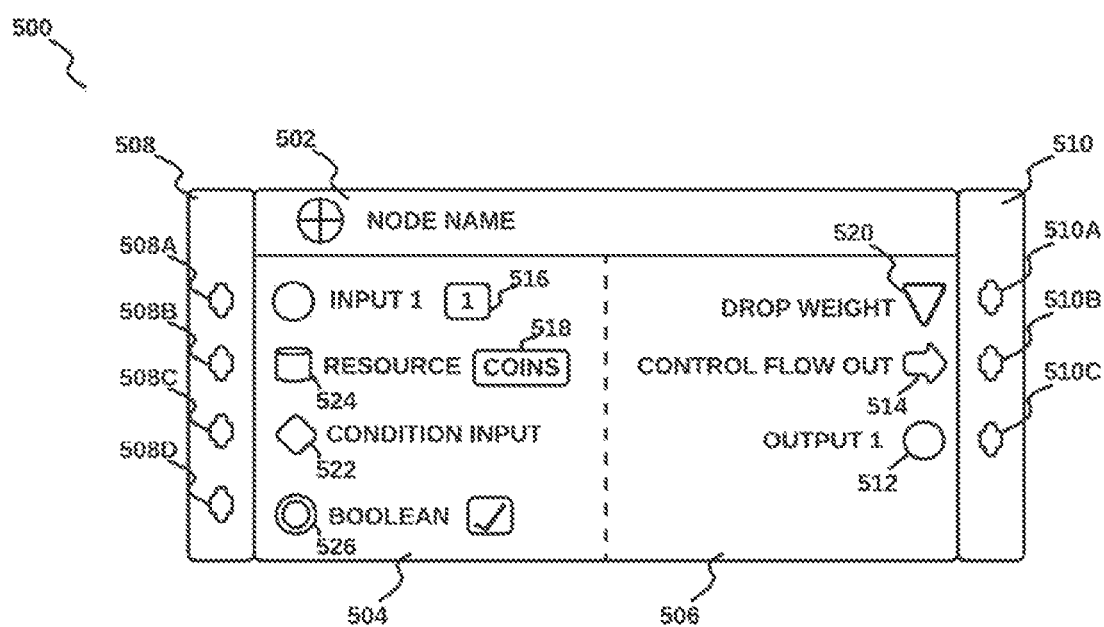
FIG. 5 is a schematic illustrating a graphical user interface display of a visual scripting node for a game design tool system, in accordance with one embodiment.

In accordance with an embodiment, as part of operation 304 of the method 300, there is provided a graphical user interface for display on a display device, the graphical user interface (GUI) comprising a means to create a graph of interconnected nodes, wherein the graph of interconnected nodes represent a game model graph 402 as generated in operation 304 of the method 300. The GUI displays a plurality of nodes which may be customized for a game model graph 402. In accordance with an embodiment, and as shown in FIG. 5, is a possible structure of a displayed node 500 within a game model graph 402. In accordance with an embodiment, each node 500 within a game model graph 402 may include a title bar 502 which may include a node icon (e.g., customized for each node) and a node title. In addition, each node includes one or more inputs 504 and one or more outputs 506. For simplicity and visual logical flow of data from left to right on a display screen, the inputs 504 are located on the left of the node 500, while the outputs 506 are located on the right side of the node 500. In accordance with an embodiment, each input is associated with an input connector (e.g., 508A to 508D) which represents a potential connection between an input of the node 500 with an output from an additional node not shown in FIG. 5. Similarly, each output is associated with an output connector (e.g., 510A to 510C) which represents a potential connection between an output of the node 500 with an input from an additional node not shown in FIG. 5.

In accordance with an embodiment, as part of operation 304, during a building of the game model graph, the output connectors (510A to 510C or collectively 510) from a first node 500 are connected to input connectors (508A to 508D or collectively 508) of the same type (e.g., types are described below) from a second node 500 not shown in FIG. 5. For example, Control Flow outputs must be connected to Control Flow inputs, Condition Data type outputs must be connected to Condition Data type inputs, Resource Data type outputs must be connected to Resource Data type inputs, and the like (Control Flow input/outputs, Condition Data input/outputs, and Resource Data input/outputs are described below).

In accordance with an embodiment, an input (or an output) may be one of two different types: either a Control Flow input/output or a Data input/output. In accordance with an embodiment, a Control Flow input/output provides control of data flow and execution of nodes over time (e.g., triggering of node execution). For example, connections along Control Flow inputs and outputs (e.g., from one node to another) determine the order in which a game model graph may be executed (e.g., node execution order within a graph, and data flow from each node in the graph). In accordance with an embodiment, a Data type input includes a plurality of types of data, including the following: a Number Data type, used to pass numerical values; an Enumeration Data type, used to select/pass a value of a pre-defined limited set of values (e.g. Seconds, Minutes, Hours, Days); a Boolean Data type, used to pass either 'true' or 'false'; a Condition Data type, which is an object that is evaluated on demand and can either 'be met' (the condition applies) or 'not be met' (the condition does not apply); a Resource Data type, which represents a resource item (e.g., from the Library Window) that is part of a modeled economy for a game (e.g., coins, cards, swords, live points, etc.); and a Drop Weight Data type, which is an object used in conjunction with a Weighted Drop node 610 (defined below) to build a lootbox-like system. In accordance with an embodiment, a Data Type input on a node can be associated with an explicit default value, which is used if no value is fed into the node via the input port. Otherwise, an input may have an implicit default value. In accordance with an embodiment, some nodes may provide a means for selecting resources and properties by means of a text field.

In accordance with an embodiment, and shown in FIG. 5 (e.g., and also in FIG. 6A-6Q, FIG. 7, FIG. 8A, FIG. 8B, FIG. 9A, and FIG. 9B), a displayed node 500 within a user interface may have different symbols for different types of inputs; outputs. For convenience of explanation, a Control Flow input/output within FIG. 5 (and also FIG. 6A-6Q, FIG. 7, FIG. 8A, FIG. 8B, FIG. 9A, and FIG. 9B) is depicted by an arrow icon 514. For convenience of explanation, a Data Type input/output within FIG. 5 (and also FIG. 6A-6Q, FIG. 7, FIG. 8A, FIG. 8B, FIG. 9A, and FIG. 9B) is depicted by a plurality of icons depending on a type of data. For example, a Drop Weight Data type is represented by inverted triangle 520 icon, a Resource Data type is represented by a database icon 524, a Condition Data type is represented by a diamond shaped icon 522, and a Number Data type and Enumeration Data type are both represented by a circle icon 512, and a Boolean Data type is represented by a double circle icon 526. In accordance with an embodiment, a Data type input may have a default value displayed 516 with the input. Similarly, a Resource Data type may have a display of a resource 518 which is associated with the input.

Figure 6A:
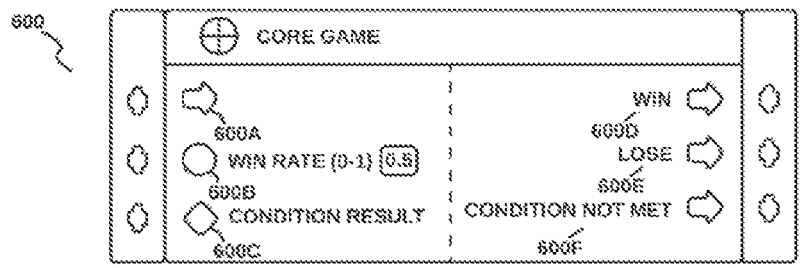
FIG. 6A is a schematic illustrating a graphical user interface display of a Core Game visual scripting node for a game design tool system, in accordance with one embodiment.
Figure 6B:
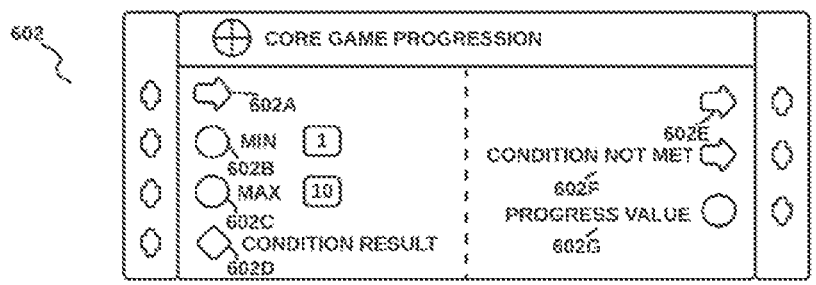
FIG. 6B is a schematic illustrating a graphical user interface display of a Core Game Progression visual scripting node for a game design tool system, in accordance with one embodiment.
Figure 6C:
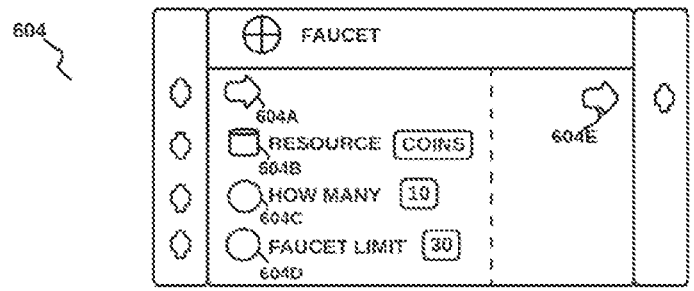
FIG. 6C is a schematic illustrating a graphical user interface display of a Faucet visual scripting node for a game design tool system, in accordance with one embodiment.
Figure 6D:
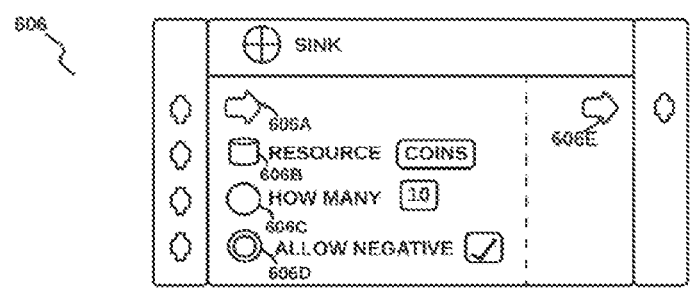
FIG. 6D is a schematic illustrating a graphical user interface display of a Sink visual scripting node for a game design tool system, in accordance with one embodiment.
Figure 6E:
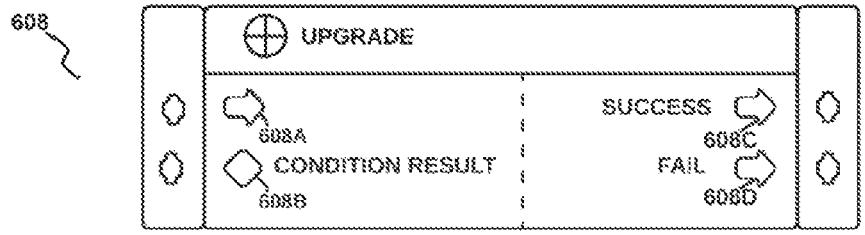
FIG. 6E is a schematic illustrating a graphical user interface display of an Upgrade visual scripting node for a game design tool system, in accordance with one embodiment.
Figure 6F:
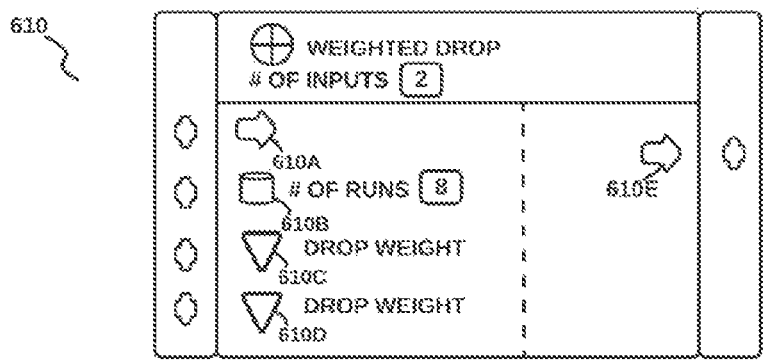
FIG. 6F is a schematic illustrating a graphical user interface display of a Weighted Drop visual scripting node for a game design tool system, in accordance with one embodiment.
Figure 6G:
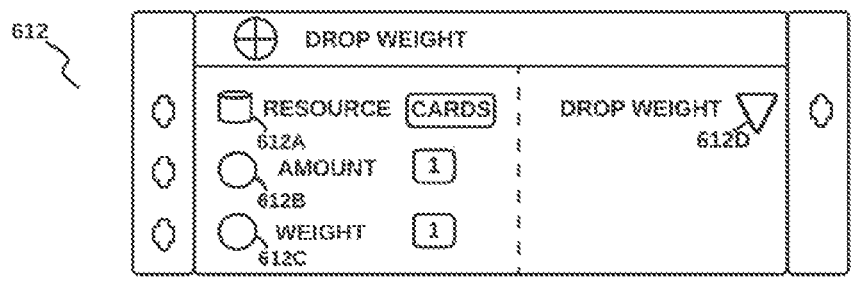
FIG. 6G is a schematic illustrating a graphical user interface display of a Drop Weight visual scripting node for a game design tool system, in accordance with one embodiment.
Figure 6H:
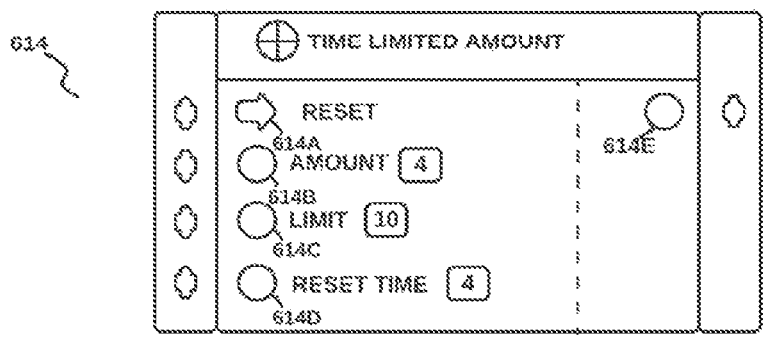
FIG. 6H is a schematic illustrating a graphical user interface display of a Time Limited Amount visual scripting node for a game design tool system, in accordance with one embodiment.
Figure 6I:
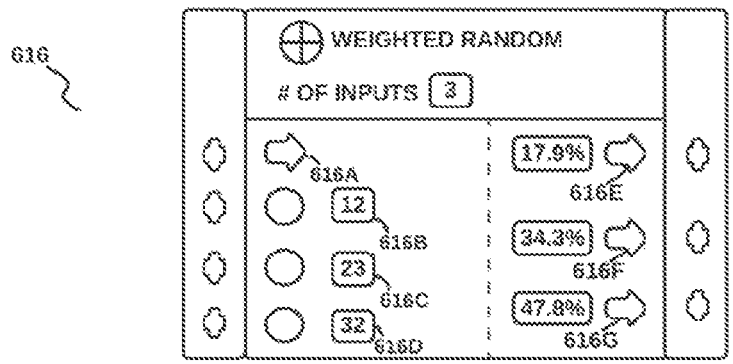
FIG. 6I is a schematic illustrating a graphical user interface display of a Weighted Random visual scripting node for a game design tool system, in accordance with one embodiment.
Figure 6J:
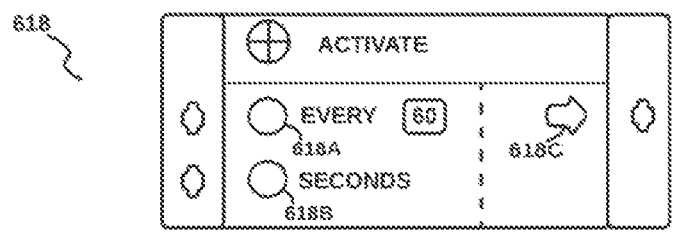
FIG. 6J is a schematic illustrating a graphical user interface display of an Activate visual scripting node for a game design tool system, in accordance with one embodiment.
Figure 6K:
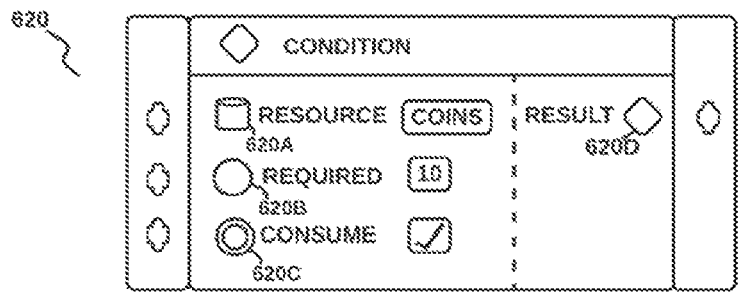
FIG. 6K is a schematic illustrating a graphical user interface display of a Condition visual scripting node for a game design tool system, in accordance with one embodiment.
Figure 6L:
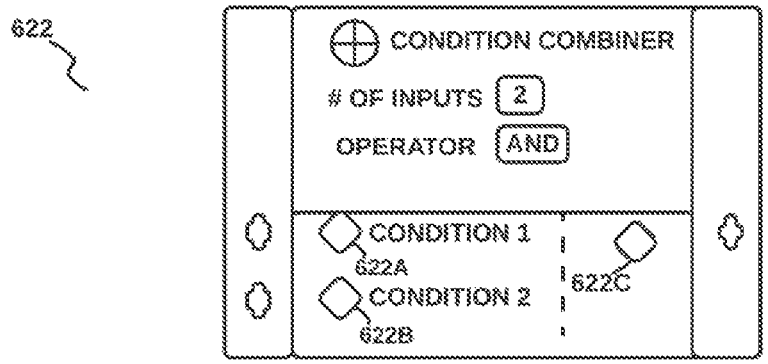
FIG. 6L is a schematic illustrating a graphical user interface display of a Condition Combiner visual scripting node for a game design tool system, in accordance with one embodiment.
Figure 6M:
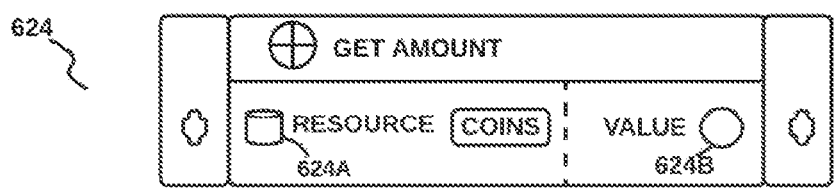
FIG. 6M is a schematic illustrating a graphical user interface display of a Get Amount visual scripting node for a game design tool system, in accordance with one embodiment.
Figure 6N:
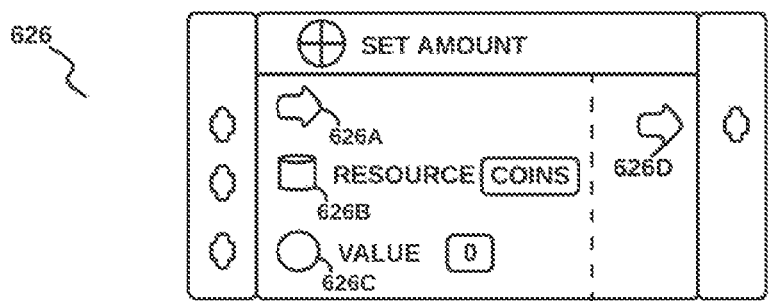
FIG. 6N is a schematic illustrating a graphical user interface display of a Set Amount visual scripting node for a game design tool system, in accordance with one embodiment.
Figure 6O:
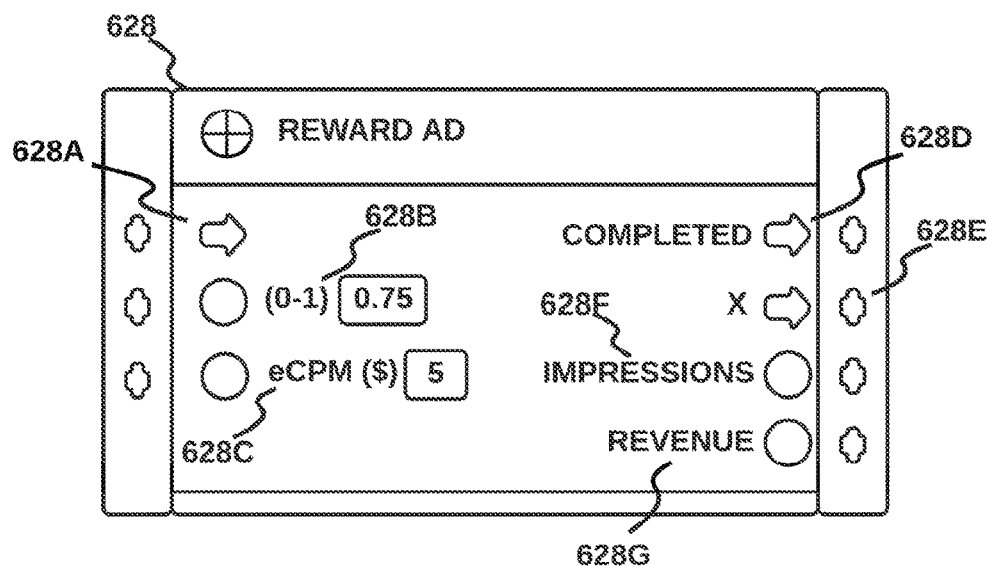
FIG. 6O is a schematic illustrating a graphical user interface display of a Reward Ad visual scripting node for a game design tool system, in accordance with one embodiment.
Figure 6P:
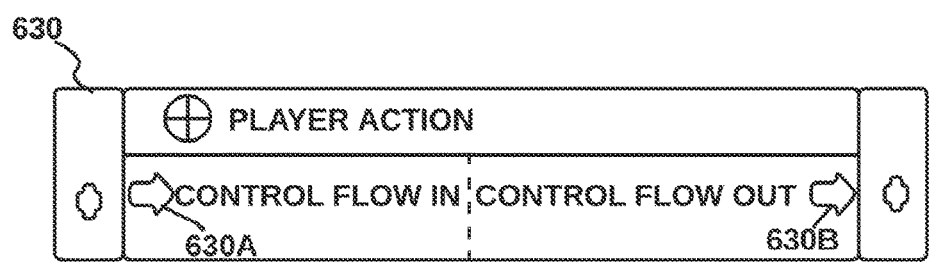
FIG. 6P is a schematic illustrating a graphical user interface display of a Player Action visual scripting node for a game design tool system, in accordance with one embodiment.
Figure 6Q:
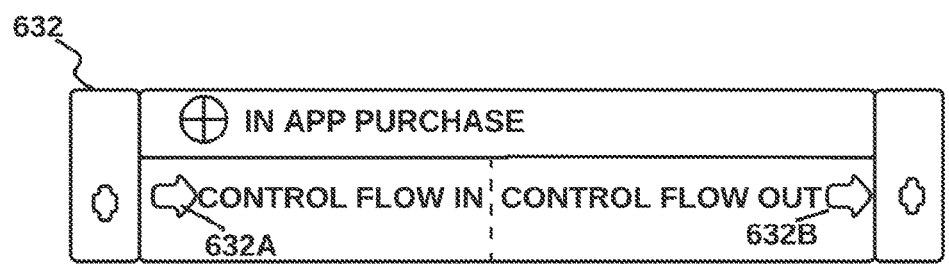
FIG. 6Q is a schematic illustrating a graphical user interface display of an In App Purchase visual scripting node for a game design tool system, in accordance with one embodiment.
Figure 8A:
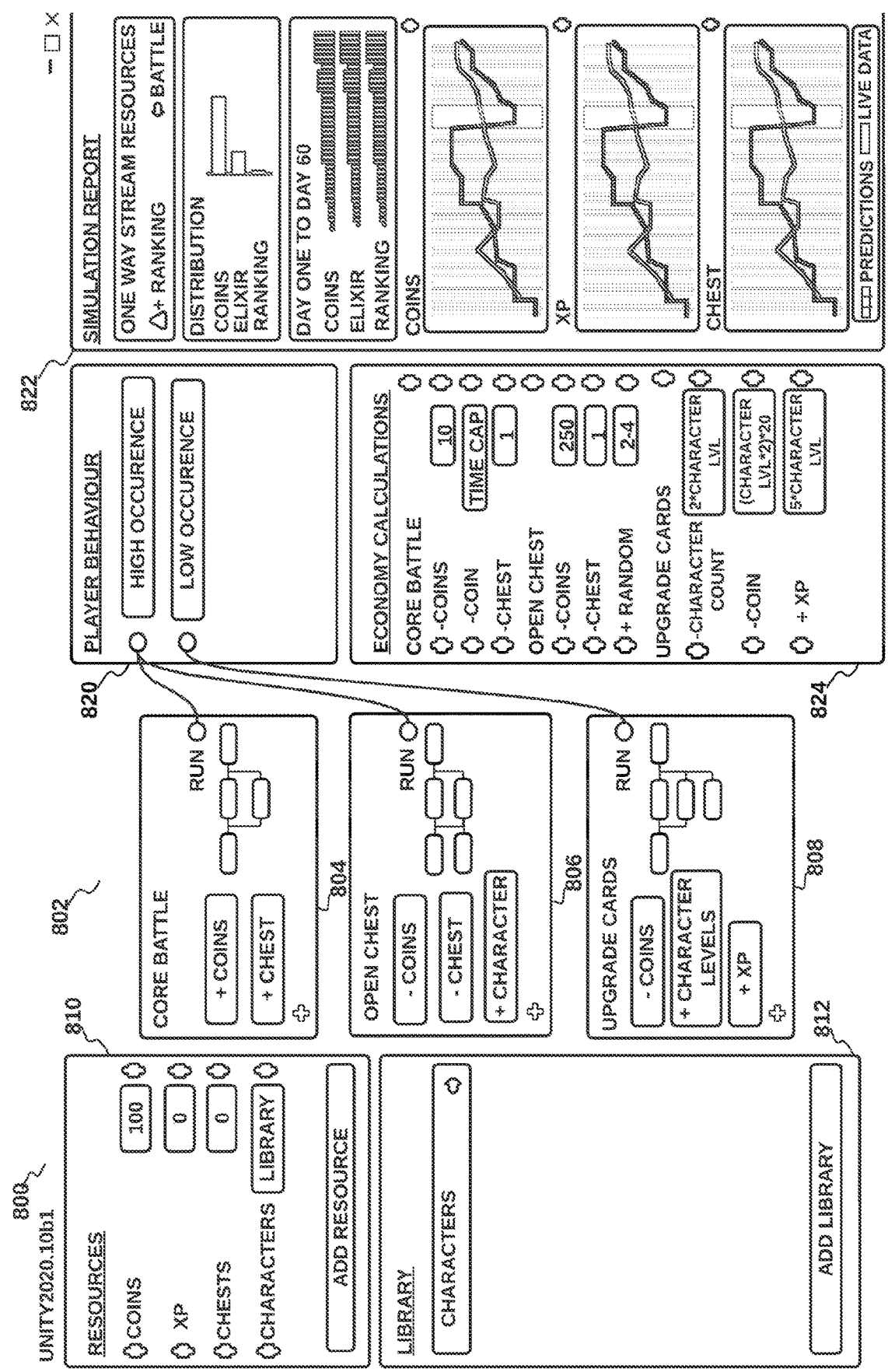
FIG. 8A is a schematic illustrating a graphical user interface display for the Game Design Tool user interface (UI) for a game design tool system, in accordance with one embodiment.

In accordance with an embodiment and shown in FIG. 6A through FIG. 6Q are a plurality of different types of nodes to be used in operation 304 when creating a game model graph. An example UI for the game design tool which incorporates the nodes is shown in FIG. 8A and FIG. 8B below.

Core Game Node

Figure 9A:
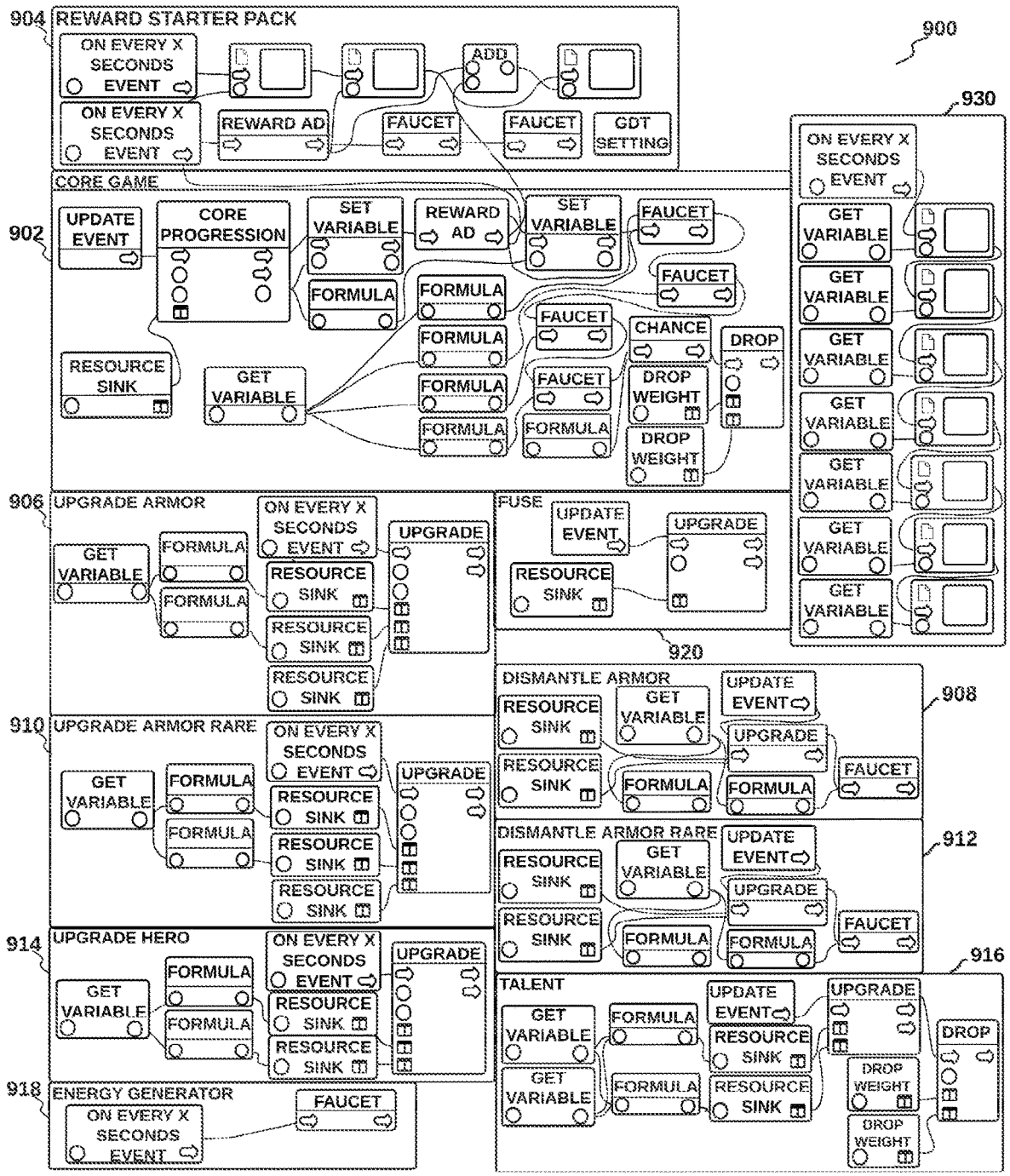
FIG. 9A is a schematic illustrating a graphical user interface display including an example game model graph within the Game Design Tool UI for a game design tool system, in accordance with one embodiment.
Figure 9B:
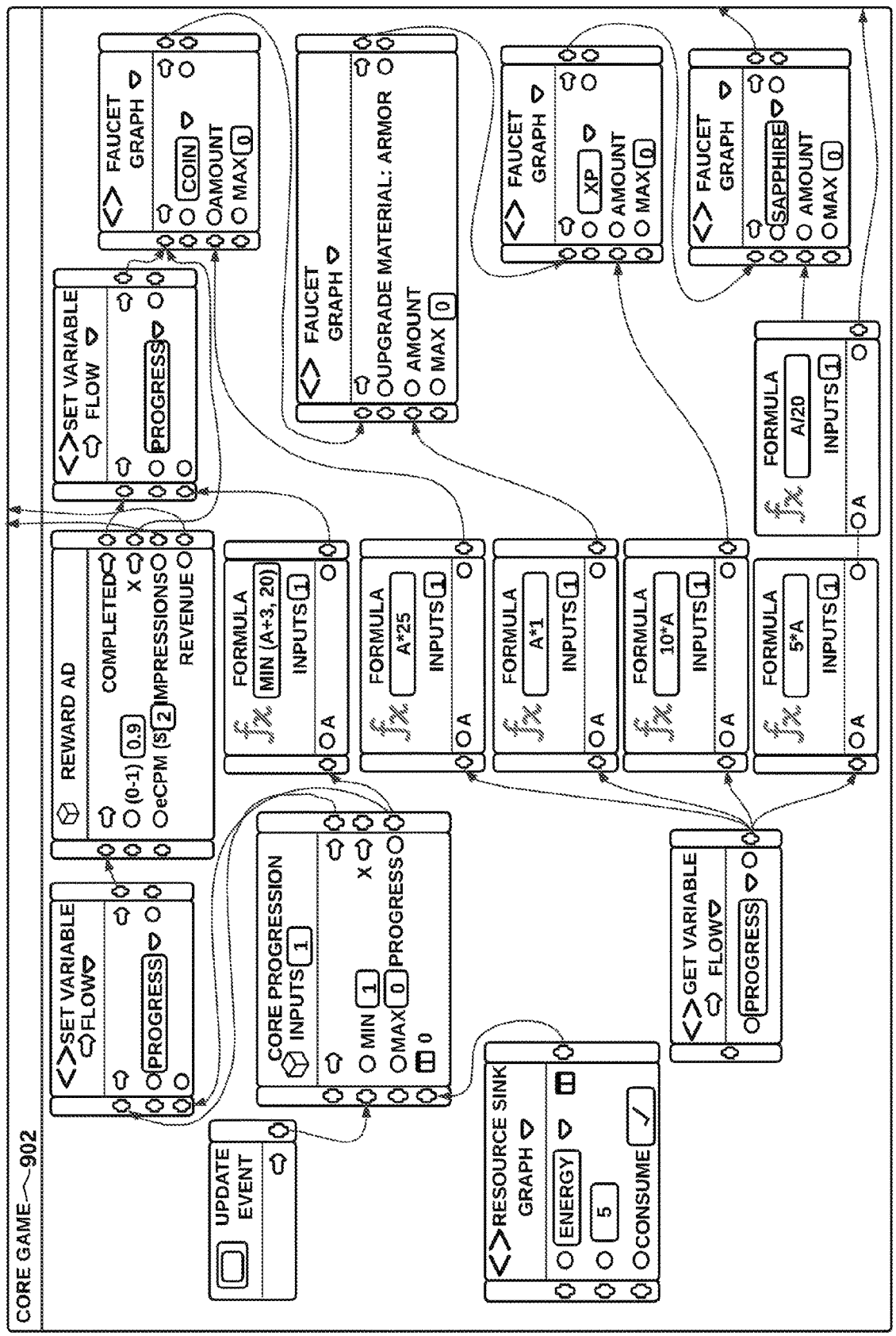
FIG. 9B is a schematic illustrating a graphical user interface display including an example game model graph within the Game Design Tool UI for a game design tool system, in accordance with one embodiment.

In accordance with an embodiment, and shown in FIG. 6A, is a GUI display of a Core Game node 600, wherein the Core Game node 600 is a visual representation of, and controlling UI for a core game within a game model graph. The Core Game node 600 is a means to represent any event within a game (e.g., a video game) that can be modeled with a win rate (e.g., a rate of winning, or a rate of success) such that an output may be a 'win' outcome (e.g., a success at the event), a 'loss' outcome (e.g., a failure at the event) or even a tie outcome (e.g., a neutral outcome of the event) (e.g., the 'tie' is not shown in FIG. 6A). In accordance with an embodiment, the Core Game node 600 may represent events such as a mini game or challenge (e.g., a treasure hunt, a race, a fight, and more) nested within a larger game (e.g., a game within a game), wherein the larger game is represented by a large game model graph comprising, a plurality of nodes and a plurality of interconnected game model graphs (e.g., as shown in. FIG. 9A and FIG. 9B). In accordance with an embodiment, the Core Game node 600 may be used in a first mode wherein the Core Game node 600 does not include any details of a mini game or challenge which it represents, rather, it includes the win rate for the mini game or challenge regardless of any details associated. with the event. As an example, consider a situation wherein a Core Game node 600 represents a mini treasure hunt within a larger first person shooter video game. The Core Game node 600 may be used to represent the mini treasure hunt regardless of any details of the treasure hunt such as a time duration of the hunt (e.g., a time limit), details of an environment in which the hunt takes place (e.g., layout of environment, style, lighting, etc.), rules for the hunt (e.g., number of treasures to find), and more. Rather, the details of the mini treasure hunt are abstracted away (e.g., removed) by representing the mini treasure hunt by the Core Game node 600 (e.g., within a game model graph) since only a win rate is used to determine an outcome of a player within the mini treasure hunt.

In accordance with an embodiment, the Core Game node 600 may be used in a second mode wherein the Core Game node 600 may be linked directly with game code (e.g., as described with respect to operation 306 of the method) wherein details of a mini game or challenge which it represents are included in the game code. In such a mode, the win rate associated with the Core Game node 600 may be linked to the game code to control an aspect of the treasure hunt (e.g., such as a difficulty level wherein the difficulty level is inversely related to the win rate so that a high win rate is related to a low difficulty level, and vice versa).

In accordance with an embodiment, inputs and outputs of the Core Game node 600 may be defined (e.g., by a user) during operation 304, including connecting other node outputs to the Core Game node 600 inputs and connecting outputs from the Core Game node 600 to other node inputs. In accordance with an embodiment, the Core Game node 600 may be linked directly to game code (e.g., during operation 306 of the method 300) and may be linked with an executable version of a game (e.g, an executable file). In accordance with an embodiment, during a designing of a game system (e.g., an economy game system) within operation 304, details within a Core Game node 600 (e.g., details related to gameplay of a core game associated with a Core Game node 600) may not be relevant, so the Core Game node 600 may be considered a "black box" and may be implemented as a random output generator which chooses from a plurality of outputs such as either a 'Win' Control Flow output 600D or a 'Lose' Control flow output 600E based on a probability distribution controlled by a 'Win Rate' Number Data input 600B and a predefined probability distribution (not shown in FIG. 6A).

In accordance with an embodiment, the Core Game node 600 includes one or more inputs. In accordance with an embodiment, the Core Game node 600 may include a Control Flow input 600A for controlling a triggering of the Core Game node 600. In accordance with an embodiment, the triggering of the Core Game node 600 includes one of the following: an execution of a predetermined Core Game associated with the Core Game node 600 (e.g., an execution of code or an executable file that describes a game) that generates an output result which is either a 'Win' 600D or a 'Lose' 600E, and an execution of a predefined probability distribution function that generates an output result which is either a 'Win' 600D or a 'Lose' 600E.

In accordance with an embodiment, a Core Game node 600 may include an input for a Win Rate 600E (e.g., a value from 0 to 1) that represents a probability of a player winning the core game linked to the Core Game node 600. In accordance with an embodiment, there many be a Condition Result input 600C that provides an additional control (e.g., in addition to the Control Flow input 600A) of the triggering of the Core Game node 600. For example, based on the Condition Result 600C evaluating to 'True' along with the Control Flow input 600A being received, the Core Game node 600 will be triggered (e.g., "played") and an output including either a 'Win' 600D or 'Lose' 600E will be triggered. Based on the Condition Result 600C evaluating to 'False', a Condition Not Met output 600F is triggered (e.g., rather than an 'Win' 600D or 'Lose' 600E output). In accordance with an embodiment, based on no valid connection existing on the Condition Result input 600C, the Condition Result is considered "met" and the Core Game node 600 will be played.

In accordance with an embodiment, the Core Game node 600 'Win' output 600D continues a flow within a graph (e.g., to any other node connected to the 'Win' output 600D) based on whether the Core Game node 600 evaluated to a win. In accordance with an embodiment, the Core Game node 600 'Lose' output 600E continues a flow within a graph (e.g., to any other node connected to the 'Lose' output 600E) based on whether the core game evaluates to a loss. In accordance with an embodiment, the Core Game node 600 may contain a 'condition not met' output 600F that continues a flow within the node system based on whether the core game evaluates to a Condition Result 600C not being met. Accordingly, any node connection connected to the 'condition not met' output 600F will be triggered based on a core game evaluating to a condition result not being met.

Core Game Progression Node

In accordance with an embodiment, and shown in FIG. 6B, there is provided a GUI display of a Core Game Progression node 602 wherein the Core Game Progression node 602 is a visual representation of, and GUI controller for player progression within a game. The Core Game Progression node 602 provides a means for modeling (e.g., by an inclusion of a Core Game Progression node 602 within a game model graph) player progression during an execution of a core game (e.g., by connection to a Core Game node 600 within a game model graph). In accordance with an embodiment, inputs and outputs of the Core Game Progression node 602 may be defined (e.g., by a user) during operation 304, including connecting other node outputs to the Core Game Progression node 602 inputs and connecting outputs from the Core Game Progression node 602 to other node inputs.

In accordance with an embodiment, the progression may relate to a measure of advancement within a game level of a game (e.g., a tracking of a player progression within a game), which can include a measure of advancement within a level in a game (e.g., progression along a path, progression towards a level end point, and the like), progression be levels within a game, progression of collectible items within a game (e.g., a number of collected items), progression with respect to weapons in a game (e.g., from simple weapons to more elaborate and powerful weapons), and the like. In accordance with an embodiment, the Core Game Progression 602 generates (e.g., when triggered by an input control flow 602A) an output progression value 602G that represents a progression value for the Core Game Progression, wherein the progression value is determined by a random numerical value between the two inputs (e.g., min 602B and max 602C) to the Core Game Progression node 602. The two inputs provide limitations for the output progression value 602G. In accordance with an embodiment, the Core Game Progression node 602 may have additional inputs, including a Control Flow input 602A which triggers (e.g., an execution) the Core Game Progression node 602, and an input for a Condition Result 602D which provides a conditional control on the triggering. For example, based on the input condition result 602D evaluating to "true", the Core Game Progression node 602 will be "played" (e.g., executed to generate an output progress value 602G) and trigger a Control Flow output 602E (e.g., to signify that the node had successfully activated). Based on the input condition result 602D evaluating to "false", the 'Condition Not Met' Control flow output 602F will be triggered and no output progress value 602G is Generated. In accordance with an embodiment, based on no valid connection existing at the input, the input Condition Result 602D may be considered "met" (e.g., as a default).

Faucet Node

In accordance with an embodiment, and shown in FIG. 6C there is provided a Faucet node 604, wherein the Faucet node 604, when triggered by a Control Flow input 604A within a game model graph, performs an action of adding an amount of a resource to a game state of a player. In accordance with an embodiment, the amount of the resource to be added may be determined with a number data type input 604C (e.g., an input labeled 'How Many' with a default value of 10). The number data type input 604C includes a numerical value for an amount of items of the resource that is added to the game state of the player by the Faucet node 604 every time the Faucet node 604 is triggered. In accordance with an embodiment, the Faucet node 604 includes a resource data type input 604B that includes a reference to a resource (e.g., a link to a resource in a library created in operation 302) that is added to the game state of the player when the Faucet node 604 is triggered. In accordance with an embodiment, the Faucet node 604 may include a Control Flow input 604A to trigger the Faucet node 604 to add the resource to the game state. In accordance with an embodiment, the Faucet node 604 may include a number data type input 604D that represents an upper limit of a total amount (e.g., a maximum total amount) of the resource that a game state of a player may include (e.g., to stop the Faucet node 604 from adding resource items once the limit is reached. For example; consider a player currently holding 23 coins, and a Faucet node 604 that produces 10 coins per visit (e.g., each time the faucet is triggered) and with a limit of 30 coins. Due to the limit of 30 coins, the Faucet node 604 would only produce an additional 7 coins (e.g., instead of producing 10 coins) so that the limit of (23+7=) 30 coins is not exceeded. In accordance with an embodiment, the Faucet node 604 may include a Control Flow output to continue a flow after the faucet performs the action of adding the resource items.

In accordance with an embodiment, inputs and outputs of the Faucet node 604 may be defined (e.g., by a user) during operation 304, including connecting other node outputs to the Faucet node 604 inputs and connecting outputs from the Faucet node 604 to other node inputs.

Sink Node

In accordance with an embodiment, and shown in FIG. 6D, there is provided a Sink node 606, wherein the Sink node 606 when triggered by a Control Flow input 606A within a game model graph, performs an action of removing an amount of a resource from a game state of a player. In accordance with an embodiment, the amount of the resource may be determined with a number data type input 606C (e.g., an input labeled 'How Many' in FIG. 6D with a default value of 10). The number data type 606C includes a value for an amount of resource items 606B that are removed from a game state of the player by the Sink node 606 every time the Sink node 606 is triggered (e.g., within a game model graph). In accordance with an embodiment, the Sink node 606 includes a resource data type input 606B that includes a reference to an existing resource (e.g., a link to a resource in a library created in operation 302) that is removed from the game state of the player when the Sink node 606 is triggered.

In accordance with an embodiment, the Sink node 606 may include a Control Flow input 606A that triggers the Sink node 606. In accordance with an embodiment, the Sink node 606 may include a Control Flow output 606E to continue a flow after the Sink node 606 removes the resource items. In accordance with an embodiment, the Sink node 606 may have an Boolean data type input 606D that allows a negative value of an amount of the resource, wherein the Sink node 606 can lead to a negative amount of the resource in the game state (e.g., if Allow Negative in FIG. 6D is "true").

In accordance with an embodiment, inputs and outputs of the Sink node 606 may be defined (e.g., by a user) during operation 304, including connecting other node outputs to the Sink node 606 inputs and connecting, outputs from the Sink node 606 to other node inputs.

Upgrade Node

In accordance with an embodiment, and shown in FIG. 6E, there is provided an Upgrade node 608, wherein the Upgrade node 608 is used to build an upgrade system within a game model graph, by evaluating an input Condition Result. In accordance with an embodiment, the Upgrade node 608 may also include a Control Flow input 608A used to trigger the Upgrade node 608. In accordance with an embodiment, the Upgrade node 608 includes a 'success' Control Flow output 608C that is triggered when the input 'Condition Result' 608B is met, and the Upgrade node 608 includes a 'fail' ControlFlow output 608D that is triggered when the 'Condition Result' 608B is not met.

In accordance with an embodiment, inputs and outputs of the Upgrade node 608 may be defined (e.g., by a user) during operation 304, including connecting other node outputs to the Upgrade node 608 inputs and connecting outputs from the Upgrade node 608 to other node inputs.

Weighted Drop Node

In accordance with an embodiment, and shown in FIG. 6F, there is provided a Weighted Drop node 610, wherein the Weighted Drop node 610 performs an action that includes selecting one out of a plurality of Drop Weight inputs (described below in the 'Drop Weight node' section) for each internal run (e.g., execution) of the Weighted Drop node 610 (e.g., wherein a number of runs is determined by an input to the Weighted Drop node 610). In accordance with an embodiment, each run of the number of runs generates an output Drop Weight. In accordance with an embodiment, a number of Drop Weight inputs for a Weighted Drop node 610 may be determined when the Weighted Drop node 610 is added to a game model graph (e.g., by a user during a graph creation). In accordance with an embodiment, there is a minimum of two Drop Weight inputs. In accordance with an embodiment, a number of internal runs to be performed by the Weighted Drop node 610 is determined by an input 610B (e.g., a "# of Runs" input as shown in FIG. 6F). In accordance with an embodiment, the selecting of an output is performed by applying a probability distribution to the number of Drop Weight inputs based on a weight of each Drop Weight (e.g., the weight of a drop weight is described below), and selecting one of the Drop Weight inputs as an output. Accordingly, the Weighted Drop node 610, may determine a probability weight for an input Drop Weight by using a value associated with the Drop Weight input as weight. For example, consider the example Weighted Drop node 610 in FIG. 6F that includes two Drop weight inputs (610C and 610D) and that would have two associated Drop Weight values (e.g., during execution when connected to two Drop Weight nodes 612 described below), wherein a first Drop Weight input 610C is associated with a first value and a second Drop Weight input 610D is associated with a second value 'B'. A first probability may be determined for the first Drop Weight input 610C that is equal to a percentage of the first value 'A' compared to a total value of Drop Weight inputs (e.g., an addition of values 'A' and 'B'), or the first probability=100%בA'/('A'+'B'). Similarly, a second probability may be determined for the second Drop Weight input 610D that is equal to a percentage of the second value 'B' compared to a total value of Drop Weight inputs (e.g., an addition of values 'A' and 'B'), or the second probability=100%בB'/('A'+'B'). Continuing with the example, during operation, the first Drop Weight input 610C is selected during the number of runs 610B with a probability of the first probability, and the second Drop Weight input 610D is selected during the number of runs 610B with a probability of the second probability. Accordingly, a Weighted Drop node 610 allows for a modeling of quasi-random systems including Lootboxes, reward systems, and enemy encounters.

In accordance with an embodiment, the inputs to a Weighted Drop node 610 includes the following: a Control Flow input 610A to trigger the Weighted Drop node 610 to select of a drop weight, a number data type (e.g., labeled '# of runs' 610B) to describe a frequency of how often the Weighted Drop node 610 runs and selects a Drop Weight internally, and a plurality of Drop Weight data type inputs (e.g., from which the Weighted Drop node 610 selects from). In accordance with an embodiment, the Weighted Drop node 610 includes a Control Flow output 610E that is triggered when all internal runs of the Weighted Drop node 610 are finished.

In accordance with an embodiment, inputs and outputs of the Weighted Drop node 610 may be defined (e.g., by a user) during operation 304, including connecting other node outputs to the Weighted Drop node 610 inputs and connecting outputs from the Weighted Drop node 610 to other node inputs.

Drop Weight Node

In accordance with an embodiment, and shown in FIG. 6G, there is provided a Drop Weight node 612, wherein the Drop Weight node 612 provides a candidate Drop Weight used as an input to a Weighted Drop node 610. In accordance with an embodiment, when triggered during operation (e.g., during execution of a game model graph), the Drop Weight node 612 drops an amount of a resource (e.g., the amount determined by an input 612C to the Drop Weight node 612) into a game state of a player based on the Drop Weight node 612 being selected by the Weighted Drop node 610 (e.g., based on a probability determined by the Weighted Drop node 610, wherein the determination is based on a weight value 612C of the Drop Weight node 612). In accordance with an embodiment, the Drop Weight node 612 includes the following inputs: a Resource Data type input 612A including a reference (e.g., link) to a resource that is added to a game state of a player based on the Drop Weight node 612 being selected by the Weighted Drop node 610, a Number Data type input 612B representing the amount number) of resource items that are to be added to the game state of the player, and a Number Data type input 612C (e.g., referred to as 'weight' in FIG. 6G) representing a probability weight that the Drop Weight node 612 (e.g., and the associated resource 612A) is selected by the Weighted Drop node 610. For example, the weight number data type input value may be relative to weights associated with other Drop Weights connected to a same Weighted Drop node 610 (e.g., as described with respect to the Weighted Drop node 610 above). In accordance with an embodiment, an output 612D of the Drop Weight node 612 is a drop weight object, wherein the Drop Weight object may include the resource 612A, the amount. 612B, and the weight 612C.

Figure 7:
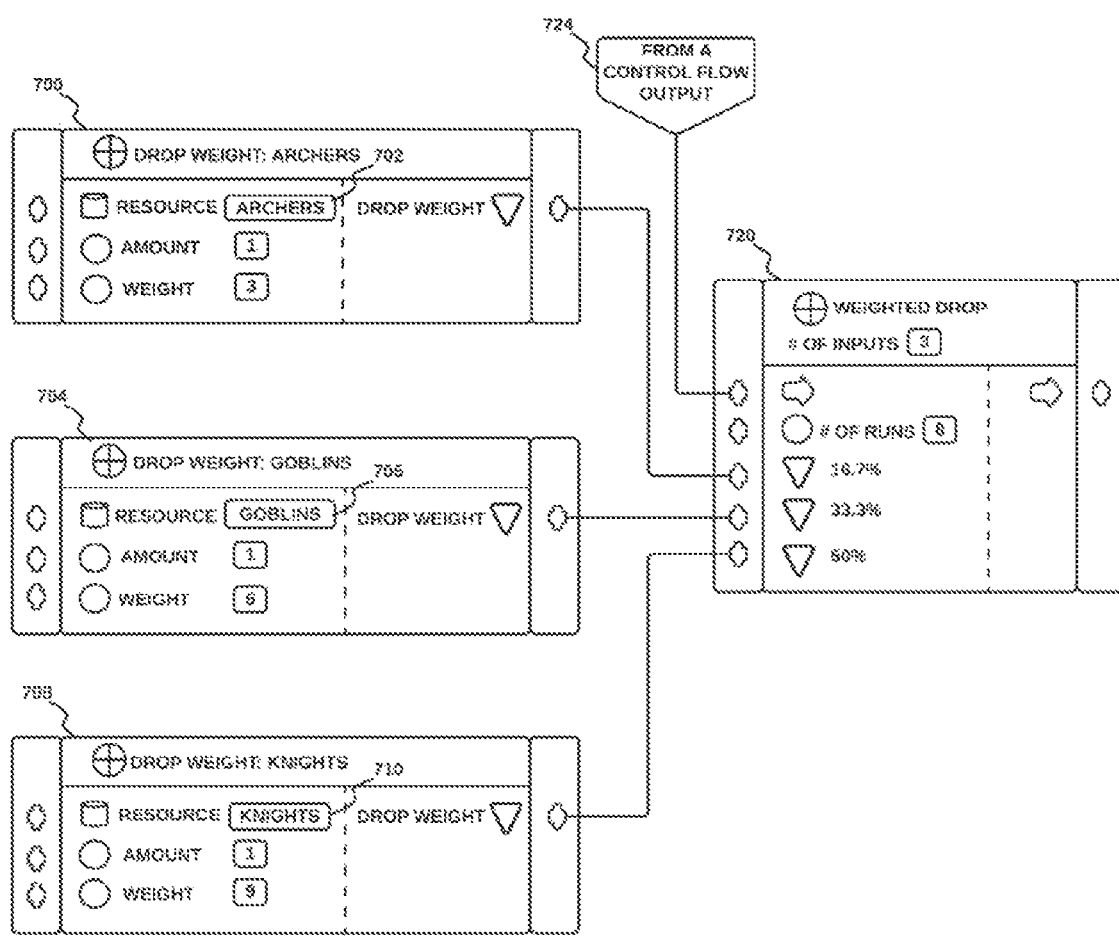
FIG. 7 is a schematic illustrating a graphical user interface display of an example graph with a Weighted Drop and three Drop Weight scripting nodes for a game design tool system, in accordance with one embodiment.

In accordance with an embodiment, an example of a Weighted Drop node 610 and a Drop Weight node 612 is shown in FIG. 7. As part of the example shown in FIG. 7, consider a Weighted Drop node 720 (e.g., similar to the Weighted Drop node 610 in FIG. 6F) with the following three Drop Weight node inputs: an Archer Drop Weight node 700 (e.g., similar to Drop Weight node 612), a Goblin Drop Weight node 704 (e.g., similar to Drop Weight node 612), and a Knight Drop Weight node 708 (e.g., similar to Drop Weight node 612) for dropping resources associated with Archers, Goblins and Knights respectively (e.g., with Archers, Goblins and Knights being resources within a game). Furthermore, according to the example shown in FIG. 7, the three Drop Weight nodes (700, 704, and 708) have weights of 3, 6, and 9 for dropping Archers, Goblins, and Knights respectively. Accordingly, a probability (e.g., 3/18 or ~16.667%) of dropping an Archer is half of a probability (e.g., 6/18 or ~33.333%) of dropping a Goblin, whereas a probability (e.g., 9/18 or 50%) of dropping a Knight is three times as high as dropping an Archer.

In accordance with an embodiment, inputs and outputs of the Drop Weight node 612 may be defined (e.g., by a user) during operation 304, including connecting other node outputs to the Drop weight node 612 inputs and connecting outputs from the Drop Weight node 612 to other node inputs.

Time Limited Amount Node

In accordance with an embodiment, and shown in FIG. 6H, there is provided a Time Limited Amount node 614, wherein the Time Limited Amount node 614 provides a timer as a means to control a functioning of a second node over time (e.g., to control an amount of production of a resource over time via a Faucet node 604, to control an amount of reduction of a resource over time via a Sink node 606, and the like). For example, the Time Limited Amount node 614 may be used in combination with a second node (e.g., with a Faucet node 604), to control how much the second node produces (e.g., of a resource) in a given time frame (e.g., wherein the time frame is described in the Time Limited Amount node 614).

In accordance with an embodiment, the Time Limited Amount node 614 includes the following inputs: a Control Flow input 614A to trigger (e.g., reset) the Time Limited Amount node 614 and output an amount, a number data type input 614B representing the amount that is produced by the Time Limited Amount node 614 every time it is triggered (e.g., unless a limit is reached), a number data type input 614C representing a limit for an aggregated amount that can be produced since a last reset (e.g., triggering), and a number data type input 614D representing a reset time (e.g., in seconds) after which the produced amount 614B is set back to 0 (e.g., to create a pause of production). In accordance with an embodiment, the Time Limited Amount node 614 includes a number data type output 614E equal to the amount 614B and passes it on (e.g., to a next node in a game model graph) if the limit 614C has not yet been reached.

In accordance with an embodiment, inputs and outputs of the Time Limited Amount node 614 may be defined (e.g., by a user) during operation 304, including connecting other node outputs to the Time Limited Amount node 614 inputs and connecting outputs from the Time Limited Amount node 614 to other node inputs.

Weighted Random Node

In accordance with an embodiment, and shown in FIG. 6I, there is provided an Weighted Random node 616, wherein the Weighted Random node 616 provides a means of producing a plurality of weighted flow control outputs (616E, 616F, and 616G), wherein only one of the outputs is triggered at a time (e.g., with each input triggering of the Weighted Random node 616). In accordance with an embodiment, the Weighted Random node 616 includes the following inputs: a Control Flow input 616A to randomly trigger one of the plurality of weighted Control Flow outputs (616E, 616F, and 616G), and a corresponding plurality of number data inputs (616B, 616C, and 616D) representing weights (e.g., which can be converted to probabilities) for each corresponding output to be triggered. While FIG. 6I shows 3 number data inputs (616B, 616C, and 616D) and 3 corresponding weighted Control Flow outputs (616E, 616F, and 616G), there can be any number of corresponding inputs and outputs. For example, in accordance with an embodiment, the number of inputs/outputs can be configured directly within the Weighted Random node 616 UI.

In accordance with an embodiment, inputs and outputs of the Weighted Random node 616 may be defined (e.g., by a user) during operation 304, including connecting other node outputs to the Weighted Random node 616 inputs and connecting outputs from the Weighted Random node 616 to other node inputs.

Activate Node

In accordance with an embodiment, and shown in FIG. 6J, there is provided an Activate node 618, wherein the Activate node 618 provides a means of controlling execution flow within a game model graph. The Activate node 618 controls a time interval for how often a Control Flow output 618C is activated (e.g., triggered.). The time interval may be provided in any time unit (e.g., seconds, minutes, hours, days or the like). In accordance with an embodiment, the Activate node 618 includes the following inputs: a number type input 618A representing a time interval value in which the Activate node 618 trigger (e.g., during operation when a game model graph is executed), and a number type input 618B representing a time unit for the time interval (e.g., seconds, minutes, hours, days). In accordance with an embodiment, the Activate node 618 includes a Control Flow output that is triggered at the given time intervals (e.g., provided by the input 618A).

In accordance with an embodiment, inputs and outputs of the Activate node 618 may be defined (e.g., by a user) during operation 304, including connecting other node outputs to the Activate node 618 inputs and connecting outputs from the Activate node 618 to other node inputs.

Condition Node

In accordance with an embodiment, and shown in FIG. 6K, there is provided an Condition node 620, wherein the Condition node 620 provides a means of specifying a resource-based condition to guard segments of a game economy flow. The Condition node 620 output 6200 is triggered if the Condition node 620 receives a specified amount of a specified resource which are both input to the Condition node 620. Optionally, based on a 'Consume' number type Boolean input 620C being true, the resource can be consumed during a triggering of the Condition node 620.

In accordance with an embodiment, a Condition node 620 may include the following inputs: a resource data type input 620A that includes a reference to a resource (e.g., the specified resource), a number data type input 620B ('Required') that represents an amount of the resource 620A that is required for the condition to apply (e.g., the specified amount) and a number data Boolean type input ('Consume') to signify whether the required amount of the resource should be consumed when the condition applies. In accordance with an embodiment, the Condition node 620 provides an output condition 620D (e.g., as a condition data type) which is a Condition object to be evaluated later in the context of the Control Flow.

In accordance with an embodiment, several Condition nodes 620 can be combined by a Condition Combiner node 622 (described below). Accordingly, a Condition node 620 is evaluated in a deferred way via a Condition Combiner node 622, whereby a resource is only consumed if a combined conditional construct within a Condition Combiner that includes the Condition node 620 applies. In accordance with an embodiment, a Condition may be used with the following nodes a Condition Combiner node 622, an Upgrade node 608, a Core Game node 600, and a Core Game Progression node 602.

In accordance with an embodiment, inputs and outputs of the Condition node 620 may be defined (e.g., by a user) during, operation 304, including connecting other node outputs to the Condition node 620 inputs and connecting outputs from the Condition node 620 to other node inputs.

Condition Combiner Node

In accordance with an embodiment, and shown in FIG. 6L, there is provided a Condition Combiner node 622 that provides a means to combine a plurality of Conditions using Boolean operators (e.g., including AND and OR operators), wherein the plurality of conditions originate in Condition nodes 620. An output is generated when the input conditions satisfy the operator function. For example, using the AND operator means that all input conditions must apply (e.g., all input conditions are met) in order to have a combined output result that applies (e.g., output condition that is met). Using the OR operator means that at least one of the input conditions has to apply (e.g., be met) in order to have a combined output result that applies (e.g., output condition that is met). The Condition combiner 622 may use any Boolean operator and is not limited to AND and OR operators. In accordance with an embodiment, a type of operator and a number of inputs for a Condition combiner 622 can be selected (e.g., via a UI).

In accordance with an embodiment, the Condition Combiner node 622 provides an output combined condition (e.g., as a condition data type) which is a Condition object to be evaluated later in the context of the Control Flow. The output combined condition is a condition statement that combines the input conditions with the operator function. For example, based on condition 1 622A and condition 2 622B being satisfied and the operator being AND (e.g., as in FIG. 6L), the output condition would be a combined condition of 'condition 1' AND 'condition 2'.

In accordance with an embodiment, Condition Combiner node 622 may be used with the following nodes: a Condition Combiner node 622, an Upgrade node 608, a Core Game node 600, and a Core Game Progression node 602. In accordance with an embodiment, inputs and outputs of the Condition Combiner node 622 may be defined (e.g., by a user) during operation 304, including connecting other node outputs to the Condition Combiner node 622 inputs and connecting outputs from the Condition Combiner node 622 to other node inputs.

Get Amount Node

In accordance with an embodiment, and shown in FIG. 6M, there is provided a Get Amount node 624, wherein the Get Amount node 624 provides a means of accessing (e.g., retrieving) a value that represents an amount of a resource (e.g., specified as an input to the node 624). The Get Amount node 624 may query a library to retrieve the value. For example, if there were 26 coins in a library, the Get Amount node 624 would retrieve the value 26. In accordance with an embodiment, based on the resource being an inventory with several items, the amount may be a value representing an aggregated amount of all items. In accordance with an embodiment, the Get Amount node 624 may have a resource input 624A that includes a reference to a resource (e.g., from a library) of which an amount of the resource is going to be determined (e.g., looked up in a database). In accordance with an embodiment, the Get Amount node 624 may have a number output representing the determined amount of the resource.

In accordance with an embodiment, inputs and outputs of the Get Amount node 624 may be defined (e.g., by a user) during operation 304, including connecting other node outputs to the Get Amount node 624 inputs and connecting outputs from the Get Am punt node 624 to other node inputs.

Set Amount Node

In accordance with an embodiment, and shown in FIG. 6N, there is provided a Set Amount node 626, wherein the Set Amount node 626 provides a means of changing an amount of a resource (e.g., within a library). In accordance with an embodiment, based on the resource being an inventory with several items, the amount of a randomly selected item of that inventory is set.

In accordance with an embodiment, the Set Amount node 626 may have a plurality of inputs, including the following: a Control Flow input 626A to directly trigger the Set Amount node 626, a resource input 626B that includes a reference to a resource (e.g., in a library) of which an amount of the resource is going to be set (e.g., changed in a database), and a number input 626C representing a new amount for the resource. In accordance with an embodiment, the Set Amount node 626 may include a Control Flow output 626D that is triggered after the resource amount value has been set.

In accordance with an embodiment, inputs and outputs of the Set Amount node 626 may be defined (e.g., by a user) during operation 304, including connecting other node outputs to the Set Amount node 626 inputs and connecting outputs from the Set Amount node 626 to other node inputs.

Reward Ad Node

In accordance with an embodiment, and shown in FIG. 6O, there is provided a Reward Ad node 628, wherein the Reward Ad node 628 provides a means of modeling a cost and a reward of displaying an ad to a player of a game. In accordance with an embodiment, the Reward Ad node 628 may have a plurality of inputs, including the following: a Control Flow input 628A to directly trigger the Reward Ad node 628 (e.g., during a simulation), a number data type input 628B representing a probability that the ad will be displayed to a user (e.g., a probability value from 0 to 1), and a number data type input 628C representing a cost per (CPM) for the ad.

In accordance with an embodiment, the Reward Ad node 628 may have a plurality of outputs, including the following: a Control Flow output 628D which is triggered after the ad has been displayed, a second control flow output 628E which is triggered if the ad was not displayed, a number data output 628F representing an amount of impressions displayed, and a number data output 628G representing an amount of revenue for the ad being displayed.

In accordance with an embodiment, inputs and outputs of the Reward Ad node 628 may be defined (e.g., by a user) during operation 304, including connecting other node outputs to the Reward Ad node inputs (628A, 628B, and 628C) and connecting outputs (628D, 628E, 628F, and 628G) from the Reward Ad node 628 to other node inputs.

Player Action Node

In accordance with an embodiment, and shown in FIG. 6P, there is provided a Player Action node 630, wherein the Player Action node 630 provides control of activation of one or more nodes attached to an output of the Player Action node 630 (e.g., controlling a triggering of attached nodes) to represent a playing of a player. In accordance with an embodiment, the Player Action node 630 may have an input that includes a name, and may have an inputs of a number data type input (not shown in the figure) representing a time interval for the Player Action node 630 to trigger. The time interval for the Player Action node 630 may be associated with a player profile such that the player profile determines a value for the time interval (as described above in operation 308 from FIG. 3, and as described with respect to player profiles from FIG. 4 (e.g., ML Agents 424, a perfect player 426, and scripted behaviors 428)).

In accordance with an embodiment, the Player Action node 630 may have a plurality of outputs, including a Control Flow output 630B which is triggered in a provided interval.

In accordance with an embodiment, inputs and outputs of the Player Action node 630 may be defined (e.g., by a user) during, operation 304, including connecting other node outputs to the Player Action node input 630A and connecting the output 630B from the Player Action node 630 to other node inputs.

In App Purchase Node

In accordance with an embodiment, and shown in FIG. 6Q, there is provided an In App Purchase node 632, wherein the In App Purchase node 632 provides a control for an in App Purchase event (e.g., amount and frequency) by a player during a simulation of a game economy. In accordance with an embodiment, the In App Purchase node 632 may be connected to the Player Action node 630 so that an interval of In App Purchase node events may be controlled by a player profile. In accordance with an embodiment, the In App Purchase node 632 may have a Control Flow input 632A to directly trigger an In App Purchase event (e.g., during a simulation). In accordance with an embodiment, the in App Purchase node 632 a Control Flow output 632B which is triggered after an In App Purchase event has beer triggered.

In accordance with an embodiment, inputs and outputs of the In App Purchase node 632 may be defined (e.g., by a user) during operation 304, including connecting other node outputs to the in App Purchase node input 632A and connecting the output 632B to other node inputs.

In accordance with an embodiment, and shown in FIG. 8A is an illustration of a graphical user interface for a Game Design Tool UI 800. In accordance with an embodiment, the Game Design Tool UI 800 includes a first display area 802 for creating and managing game model graphs (e.g., as described with respect to operation 304 of the method 300 shown in FIG. 3), wherein the game model graphs are represented by graphical user interface (GUI) windows (e.g., these may be considered as supernodes since they contain a graph of other nodes). The GUI windows represent a collapsed view of a game model graph. In FIG. 8A there are three GUI windows labeled as 'Core Battle' 804, 'Open Chest' 806, and. 'Upgrade Cards' 808. Each of these GUI windows may be expanded (e.g., to show a complete game model graph) within the first display area 802 as shown in FIG. 8B for the 'Open Chest' GUI window 806. Each of the shown GUI windows (804, 806, and 808 represent a game model graph created (e.g., by a user in operation 304) to model (e.g., via simulation as described in operation 310) and control (e.g., via connection to game code as described in operation 306) a part or aspect of a game.

In the example shown in FIG. 8A, the Core Battle 804 GUI window and associated game model graph may represent a modeling of a battle within a game that adds one or more coins and one or more chests to a player if the associated game model graph determines that the player is successful at the core battle for a simulation (note that the Core Battle 804 is linked to the Player Behavior 820 window control for a high occurrence such that the Core Battle 804 will be run with a high occurrence in a simulation.

In the example shown in FIG. 8A, the Open Chest 806 GUI window and associated game model graph may represent a modeling of an opening of a chest within a game that requires one or more coins and one or more chests in order to run during a simulation, and produces a character for a player (note that the Open Chest 806 GUI window is linked to the Player Behavior 820 window control for a high occurrence such that the Open Chest 806 GUI will be run with a high occurrence in a simulation. Details of an Open Chest 606 game model graph is shown in FIG. 8B and described below.

In the example shown in FIG. 8A, the Upgrade Cards 808 GUI window and associated game model graph may represent a modeling of a player choosing an available upgrade within a game, wherein the upgrade requires one or more coins to initiate and provides the player with one or more XP (e.g., points) and increase a playing level within the game for the player (note that the Upgrade Cards is linked to the Player Behavior 820 window control for a low occurrence such that the Upgrade Cards will run with a low occurrence in a simulation.

In accordance with an embodiment, though not shown in FIG. 8A, there may be a Game Design Toolbar UI window which provides a means to access game nodes as described and shown in FIG. 6A through FIG. 6Q. For example, the Game Design Tool UI window may be a dropdown menu with a list of the game nodes.

In accordance with an embodiment, the Game Design Tool UI 800 includes a second display area 810 for creating and managing resources as described above with respect to operation 302 of the method 300 shown in FIG. 3. In accordance with an embodiment, the Game Design Tool UI 800 includes a third display area 812 for creating and managing libraries as described above with respect to operation 302 and 304 of the method 300 shown in FIG. 3. In accordance with an embodiment, the Game Design Tool UI 800 includes a fourth display area 820 for creating and managing player behavior which may be linked to a player profile as described with respect to operation 306 of the method 300 shown in FIG. 3. In accordance with an embodiment, the Game Design Tool UI 800 includes a fifth display area 822 for creating and managing a simulation report as described with respect to operation 310 and 312 of the method 300 shown in FIG. 3. In accordance with an embodiment, the Game Design Tool UI 800 includes a sixth display area 824 'Economy Calculation' for creating and managing a game economy by providing a means to modify inputs and parameters for the three displayed GUI windows (e.g., 804, 806, and 808) without the need to open (e.g., expand) the GUI windows and modify nodes within the associated game model graphs (e.g., as shown in FIG. 8B). For example in FIG. 8A within the sixth display area 824, there are controls (e.g., inputs and parameters) such as 'coins', 'chest', 'Random' and more for directly modifying the function of each associated game model graph during a simulation.

In accordance with an embodiment, and shown in FIG. 8B is an illustration of the graphical user interface described in FIG. 8A wherein the first display area 802 includes an expanded view of the open chest GUI window 806 to reveal an associated game model graph 825 for opening a chest. The game model graph 825 contains a sink node 830, an upgrade node 832, a faucet node 836, and a random node 834 (e.g., a node to generate a random number) linked together (e.g., by a user during operation 304). The sink node 830 may be similar to the sink node 606 described with respect to FIG. 6D. The faucet node 836 may be similar to the faucet node 604 described with respect to FIG. 6G. The upgrade node 832 may be similar to the upgrade node 608 described with respect to FIG. 6E. The game model graph 825 in FIG. 8B represents a modeling of an opening of a chest during a game simulation (e.g., or during a real game if the game model graph 825 is connected to code as described in operation 306). The game model graph 825 in FIG. 8B shows that a chest (e.g., via the sink node 830) is required for the open chest 806 to run and that coins are provided as an upgrade (e.g., via the upgrade node 832) and a Goblin count is increased (e.g., via the Faucet node 836) by an amount controlled by the random number node 834. The specific game model graph 835 shown in FIG. 8B is shown as an example of a game model graph for teaching purposes and should not be understood to limit the scope of the disclosure herein.

In accordance with an embodiment, FIG. 9A is an illustration of a plurality of came model graphs 900 associated with a single game, wherein each one of the plurality of game model graphs 900 models an aspect of the single game (each aspect is chosen by a user such as a game developer) using one or more nodes as described with respect to FIG. 6A to 6Q. The plurality of game model graphs 900 may be of varying complexity and are not limited to the specific game model graphs 900 shown in FIG. 9A. In accordance with an embodiment, the plurality of game model graphs 900 may be displayed in the first display area 802 of the Game Design Tool UI 800 (e.g., as shown in FIG. 8A and 8B). In accordance with an embodiment, the plurality of game model graphs 900 may be created during operation 304 of the method 300 by dragging and dropping nodes into the first display area 802 and connecting node outputs and node inputs with connectors.

In accordance with an embodiment, each of the game model graphs of the plurality of game model graphs 900 may be connected to another game model graph within the plurality of game model graphs, wherein the connection is from a first node (e.g., an output of the first node) in a first game model graph to a second node (e.g., an input to the second node) in a second game model graph. For example, a core game progression node 602 (e.g., as shown in FIG. 6B) in a first game model graph may control an upgrade node 608 (e.g., as shown in FIG. 6E) in a second game model graph.

In accordance with an embodiment, and as shown in the example of FIG. 9A, there is a first 'Core Game' game model graph 902 which models a progression through the single game and is described in more detail in FIG. 9B. In accordance with an embodiment, and as shown in the example of FIG. 9A, there is a second 'Reward Starter Pack' game model graph 904 which models an awarding of a starter pack to a player of the single game. In accordance with an embodiment, and as shown in the example of FIG. 9A, there is a third 'Upgrade Armor' game model graph 906 which models an upgrading of armor within the single game. In accordance with an embodiment, and as shown in the example of FIG. 9A, there is a fourth 'Dismantle Armor' game model graph 908 which models a dismantling of armor (e.g., a removal of armor) within the single game. In accordance with an embodiment, and as shown in the example of FIG. 9A, there is a fifth 'Upgrade Armor Rare' game model graph 910 which models an rare upgrading of armor for a player (e.g., to a powerful armor) within the single game. In accordance with an embodiment, and as shown in the example of FIG. 9A, there is a sixth 'Dismantle Armor Rare' game model graph 912 which models a dismantling of a player's rare armor within the single game (e.g., a rare armor received within the Upgrade Armor Rare 910 game model graph). In accordance with an embodiment, and as shown in the example of FIG. 9A, there is a seventh 'Upgrade Hero' game model graph 914 which models an upgrading of a Hero (e.g., wherein the 'Hero' may be the player's character; within the single game. In accordance with an embodiment, and as shown in the example of FIG. 9A, there is an eighth 'Talent' game model graph 916 which models a talent level of a character in the single game (e.g., the 'Hero'). In accordance with an embodiment, and as shown in the example of FIG. 9A, there is a ninth 'Energy Generator' game model graph 918 which models a process of adding energy to a character within the single game (e.g., the 'Hero'). In accordance with an embodiment, and as shown in the example of FIG. 9A, there is a tenth game model graph 930 which controls a displaying of simulation results for a simulation of the single game (e.g., a rare armor received within the Upgrade Armor Rare 910 game model graph). The displaying game model graph 930 provides controls for simulation results to be displayed in the Game Design UI 800 within the fifth display area 'Simulation Report' 822.

In accordance with an embodiment, and shown in FIG. 9B is an example expanded view of the 'Core Game' game model graph 902 from FIG. 9A. The expanded view is similar to the view shown in FIG. 8B wherein the 'Core Game' game model graph 902 includes various nodes described in FIG. 6A through FIG. 6Q.

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors processor-implemented modules may be distributed across a number of geographic locations.

Figure 10:
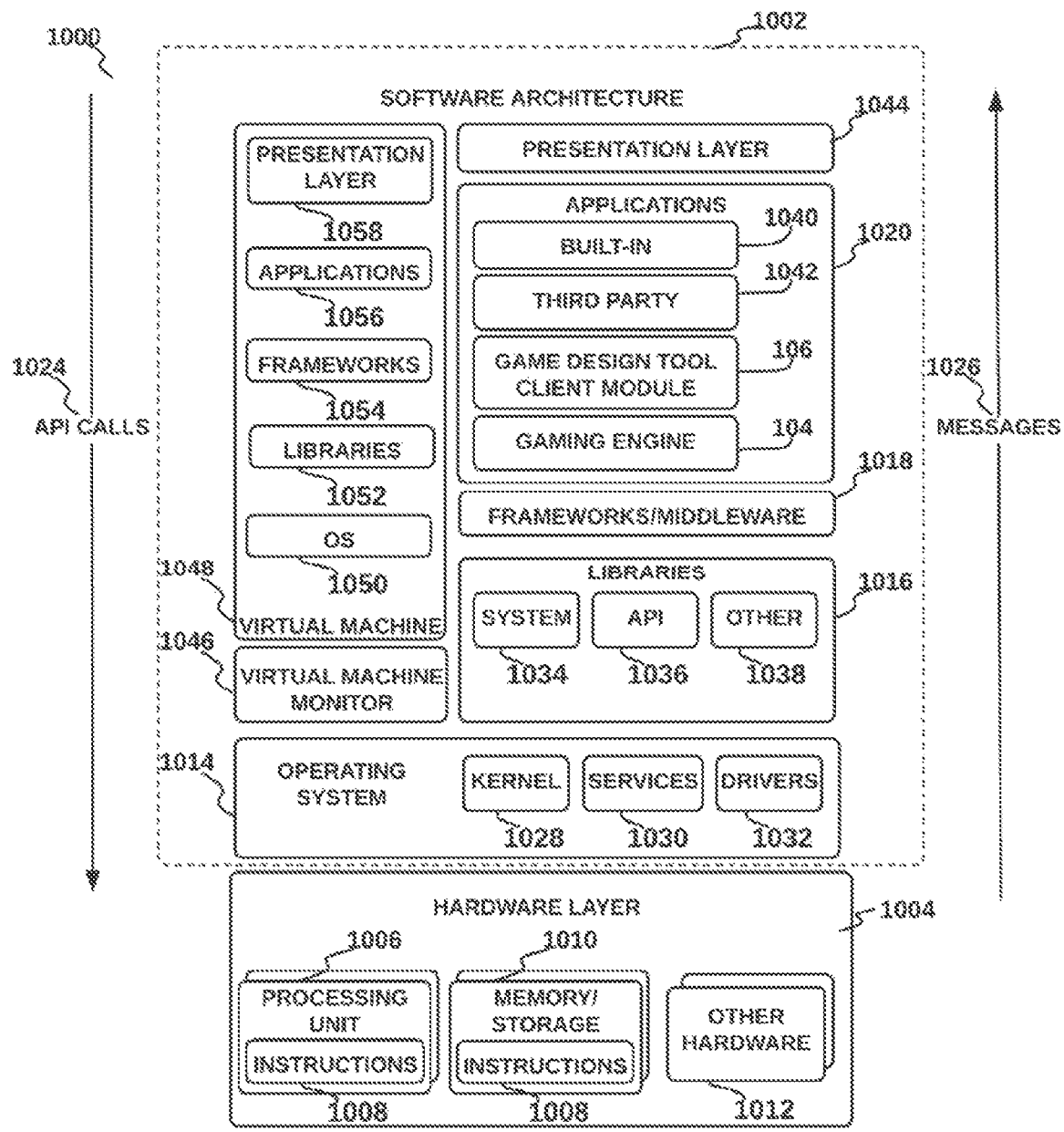
FIG. 10 is a block diagram illustrating an example software architecture, which may be used in conjunction with various hardware architectures described herein.

FIG. 10 is a block diagram 1000 illustrating an example software architecture 1002, which may be used in conjunction with various hardware architectures herein described to provide a gaming engine 104 and/or components of the Game Design Tool system 100. FIG. 10 is a non-limiting example of a software architecture and it will be appreciated that many other architectures may be implemented to facilitate the functionality described herein. The software architecture 1002 may execute on hardware such as a machine 1100 of FIG. 11 that includes, among other things, processors 1110, memory 1130, and input/output (I/O) components 1150. A representative hardware layer 1004 is illustrated and can represent, for example, the machine 1100 of FIG. 11. The representative hardware layer 1004 includes a processing unit. 1006 having associated executable instructions 1008. The executable instructions 1008 represent the executable instruction, of the software architecture 1002, including implementation of the methods, modules and so forth described herein. The hardware layer 1004 also includes memory/storage 1010, which also includes the executable instructions 1008. The hardware layer 1004 may also comprise other hardware 1012.

In the example architecture of FIG. 10, the software architecture 1002 may be conceptualized as a stack of layers where each layer provides particular functionality. For example, the software architecture 1002 may include layers such as an operating system 1014, libraries 1016, frameworks or middleware 1018, applications 1020 and a presentation layer 1044. Operationally, the applications 1020 and/or other components within the layers may invoke application programming interface (API) calls 1024 through the software stack and receive a response as messages 1026. The layers illustrated are representative in nature and not all software architectures have all layers. For example, some mobile or special purpose operating systems may not provide the frameworks/middleware 1018, while others may provide such a layer. Other software architectures may include additional or different layers.

The operating system 1014 may manage hardware resources and provide services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other services for the other software layers. The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1016 may provide an infrastructure that may be used by the applications 1020 and/or other components and/or layers. The libraries 1016 typically provide functionality that allows other software modules to perform tasks in an easier fashion than to interface directly with the underlying operating system 1014 functionality (e.g., kernel 1028, services 1030 and/or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media format such as MPFG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks 1018 (also sometimes referred to as mdddleware) provide a higher-level infrastructure that may be used by the applications 1020 and/or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be utilized by the applications 1020 and/or other software components/modules, some of which may be specific to particular operating system or platform.

The applications 1020 include built-in applications 1040 and/or third-party applications 1042. Examples of representative built-in applications 1040 may include, but are not limited to, a contacts application, a browser application, a book reader application, a location application, a media application, a messaging application, and/or a game application. Third-party applications 1042 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 1042 may invoke the API calls 1024 provided by the mobile operating system such as operating system 1014 to facilitate functionality described herein.

The applications 1020 may use built-in operating system functions (e.g., kernel 1028, services 1030 and/or drivers 1032), libraries 1016, or frameworks/middleware 1018 to create user interfaces to interact with users of the system. Alternatively, or additionally, in some systems, interactions with a user may occur through a presentation layer, such as the presentation layer 1044. In these systems, the application/module "logic" can be separated from the aspects of the application/module that interact with a user.

Some software architectures use virtual machines. In the example of FIG. 10, this is illustrated by a virtual machine 1048. The virtual machine 1048 creates a software environment where applications/modules can execute as if they were executing on a hardware machine (such as the machine 1100 of FIG. 11, for example). The virtual machine 1048 is hosted by a host operating system (e.g., operating system 1014) and typically, although not always, has a virtual machine monitor 1046, which manages the operation of the virtual machine 1048 as well as the interface with the host operating system. (i.e., operating system 1014). A software architecture executes within the virtual machine 1048 such as an operating system (OS) 1050, libraries 1052, frameworks 1054, applications 1056, and/or a presentation layer 1058. These layers of software architecture executing within the virtual machine 1048 can be the same as corresponding layers previously described or may be different.

Figure 11:
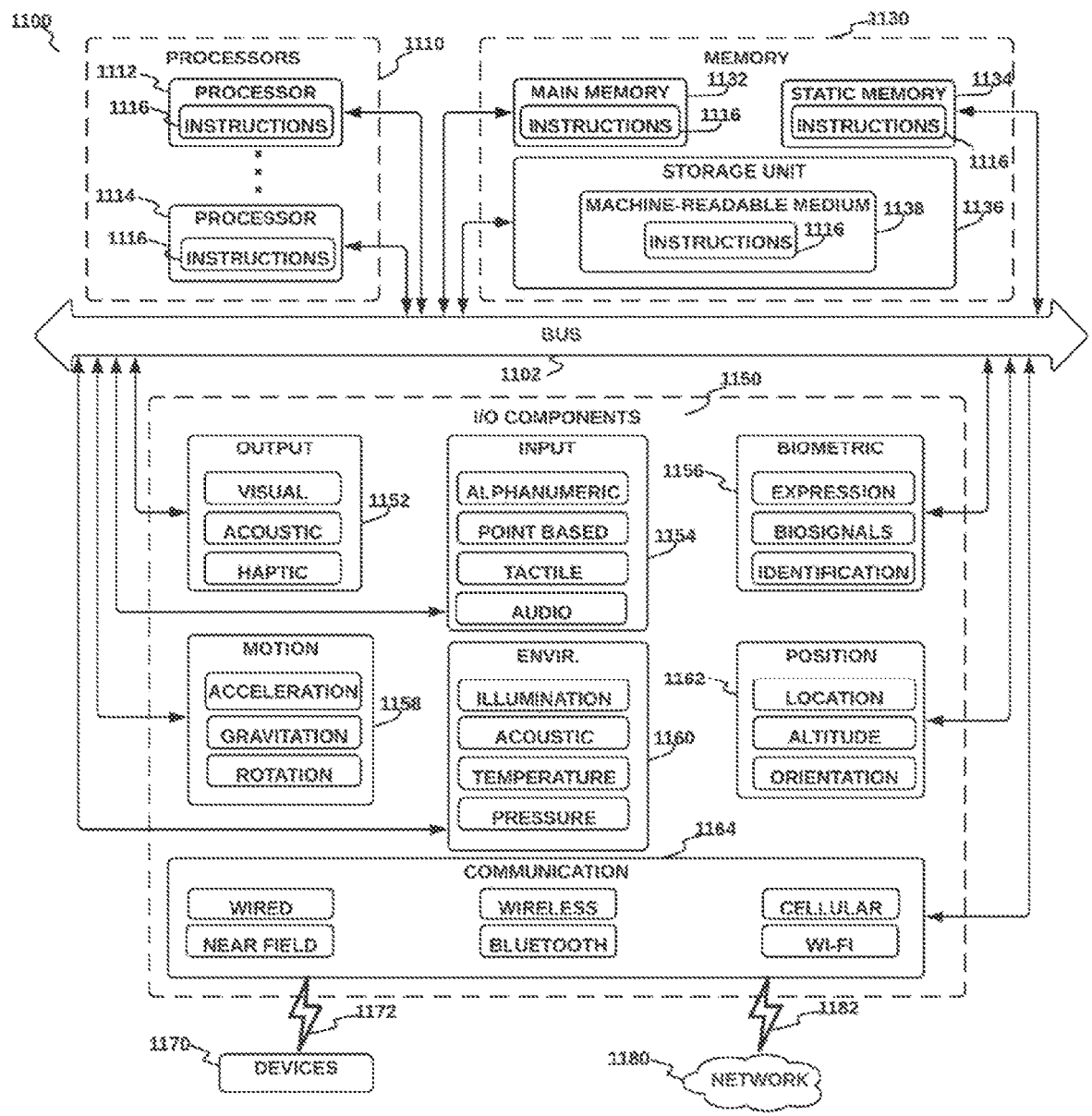
FIG. 11 is a block diagram illustrating components of a machine, according to some example embodiments, configured to read instructions from a machine-readable medium (e.g., a machine-readable storage medium) and perform any one or more of the methodologies discussed herein.

FIG. 11 is a block diagram illustrating components of a machine 1100, according to some example embodiments, configured to read instructions from a machine-readable medium (e.g., a machine-readable storage medium) and perform any one or more of the methodologies discussed herein. In some embodiments, the machine 1100 is similar to the game design tool user device 102. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. As such, the instructions 1116 may be used to implement modules or components described herein. The instructions transform the general, non-programmed machine into a particular machine programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines that individually or jointly execute the instructions 1116 to perform any one or more of the methodologies discussed herein.

The machine 1100 may include processors 1110, memory 1130, and input/output (I/O) components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1112 and a processor 1114 that may execute the instructions 1116. The term "processor" is intended to include multi-core processor that may comprise two or more independent processors (sometimes referred to as "cores") that may execute instructions contemporaneously. Although FIG. 11 shows multiple processors, the machine 1100 may include a single processor with a single core, a single processor with multiple cores (e.g., a multi-core processor), multiple processors with a single core, multiple processors with multiples cores, or any combination thereof.

The memory/storage 1130 may include a memory, such as a main memory 1132, a static memory 1134, or other memory, and a storage unit 1136, both accessible to the processors 1110 such as via the bus 1102. The storage unit 1136 and memory 1132, 1134 store the instructions 1116 embodying any one or more of the methodologies or functions described herein. The instructions 1116 may also reside, completely or partially, within the memory 1132, 1134, within the storage unit 1136, within at least one of the processors 1110 (e.g., within the processor's cache memory), or any suitable combination thereof, during execution thereof by the machine 1100. Accordingly, the memory 1132, 1134, the storage unit 1136, and the memory of processors 1110 are examples of machine-readable media 1138.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 1116. The term "machine-readable medium" shall also be taken include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 1150 may include a wide variety of components to receive input, provide output, produce output, transmit information, exchange information, capture measurements, and so on. The specific input/output (I/O) components 1150 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 1150 may include many other components that are not shown in FIG. 11. The input/output (I/O) components 1150 are grouped according to functionality merely for simplifying the following discussion and the grouping is in no way limiting. In various example embodiments, the input/output (I/O) components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pies sure sensor components (e.g., barometer), acoustic sensor components one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (110) components 150 may include communication components 1164 operable to couple the machine 1100 to a network 1180 or devices 1170 via a coupling 1182 and a coupling 1172 respectively. For example, the communication components 1164 may include a network interface component or other suitable device interface with the network 1180. In further examples, the communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a Universal Serial Bus (USB)).

Moreover, the communication components 1164 may detect identifiers or include components operable to detect identifiers. For example, the communication components 1164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1162, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

We claim:

1. A system comprising:
   one or more computer processors;
   one or more computer memories;
   a set of instructions incorporated into the one or more computer memories, the set of instructions configuring the one or more computer processors to perform operations, the operations comprising:
   creating or modifying a game model graph of a video game using visual scripting nodes, the game model graph representing one or more game systems or one or more game economies, the nodes associated with game resources from the video game;
   accessing player profiles describing a plurality of different player types, wherein the player types modify a simulation of the game model graph;
   performing one or more additional simulations, wherein each of the one or more additional simulations includes executing the game model graph using the player profiles and the game resources; and
   extracting data from the one or more additional simulations to determine behavior of the one or more game systems, the one or more game economies, or the game resources within the video game over time and across the player types.

2. The system of claim 1, wherein the visual scripting nodes of the game model graph are integrated with game code of the video game, and wherein property values of the nodes are associated with values within the code.

3. The system of claim 2, wherein changes in one or more nodes, and changes in the game model graph structure are reflected in the game code.

4. The system of claim 1, wherein the operations further comprise integrating data from one or more live games to the simulation of the game model graph, wherein the integrating may include modifying the game resources and/or the player profiles based on the data.

5. The system of claim 4, wherein the operations for determining behavior of the one or more game systems, the one or more game economies, and the resources within the video game over time and across the player types includes a use of the integrated data from one or more live games.

6. The system of claim 1, wherein the simulation of the game model graph is performed by a trained artificial intelligence agent.

7. The system of claim 1, wherein the determining of the behavior includes displaying an amount of a game resource over time during a simulation.

8. A non-transitory computer-readable storage medium storing a set of instructions that, when executed by one or more computer processors, cause the one or more computer processors to perform operations, the operations comprising:
   creating or modifying a game model graph of a video game using visual scripting nodes, the game model graph representing game systems or one or more game economies, the nodes associated with game resources from the video game;
   accessing player profiles describing a plurality of different player types, wherein the player types modify a simulation of the game model graph;
   performing one or more additional simulations, wherein each of the one or more additional simulations includes executing the game model graph using the player profiles and the game resources; and extracting data from the one or more additional simulations to determine behavior of the one or more game systems, the one or more game economies, or the game resources within the video game over time and across the player types.

9. The non-transitory computer-readable storage medium of claim 8, wherein the visual scripting nodes of the game model graph are integrated with game code of the video game, and wherein property values of the nodes are associated with values within the code.

10. The non-transitory computer-readable storage medium of claim 9, wherein changes in one or more nodes, and changes in the game model graph structure are reflected in the game code.

11. The non-transitory computer-readable storage medium of claim 8, wherein the operations further comprise integrating data from one or more live games to the simulation of the game model graph, wherein the integrating may include modifying the game resources and/or the player profiles based on the data.

12. The non-transitory computer-readable storage medium of claim 11, wherein the operations for determining behavior of the one or more game systems, the one or more game economies, or the game resources within the video game over time and across the player types includes a use of the integrated data from one or more live games.

13. The non-transitory computer-readable storage medium of claim 8, wherein the simulation of the game model graph is performed by a trained artificial intelligence agent.

14. The non-transitory computer-readable storage medium of claim 8, wherein the determining of the behavior includes displaying, an amount of at least one of the game resources over time during a simulation.

15. A method comprising:
creating or modifying a game model graph of a video game using visual scripting nodes, the game model graph representing one or more game systems or one or more game economies, and wherein the nodes are associated with game resources from the video game;

accessing player profiles describing a plurality of different player types, wherein the player types modify a simulation of the game model graph;

performing one or more additional simulations, wherein each of the one or more additional simulations includes executing the game model graph using the player profiles and the game resources; and extracting data from the one or more additional simulations to determine behavior of the one or more game systems, the one or more game economies, or the game resources within the video game over time and across the player types.

16. The method of claim 15, wherein the visual scripting nodes of the game model graph are integrated with game code of the video game, and wherein property values of the nodes are associated with values within the code.

17. The method of claim 15, wherein changes in one or more nodes, and changes in the game model graph structure are reflected in the game code.

18. The method of claim 15, wherein the operations further comprise integrating data from one or more live games to the simulation of the game model graph, wherein the integrating may include modifying the game resources and/or the player profiles based on the data.

19. The method of claim 18, wherein the operations for determining behavior of the one or more game systems, the one or more game economies, or the resources within the video game over time and across the player types includes a use of the integrated data from one or more live games.

20. The method of claim 15, wherein the simulation of the game model graph is performed by a trained artificial intelligence agent.

* * * * *